United States Patent
Kim et al.

(10) Patent No.: US 8,472,040 B2
(45) Date of Patent: *Jun. 25, 2013

(54) HOST APPARATUS, IMAGE FORMING APPARATUS, AND DIAGNOSIS METHOD FOR IMAGE FORMING APPARATUS

(75) Inventors: Hyun-cheol Kim, Seongnam-si (KR); Tae-yoon Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 877 days.

This patent is subject to a terminal disclaimer.

(21) Appl. No.: 12/571,967

(22) Filed: Oct. 1, 2009

(65) Prior Publication Data

US 2010/0020361 A1 Jan. 28, 2010

Related U.S. Application Data

(63) Continuation-in-part of application No. 12/472,676, filed on May 27, 2009.

(30) Foreign Application Priority Data

Jul. 28, 2008 (KR) .............................. 10-2008-73624

(51) Int. Cl.
*H04N 1/00* (2006.01)
(52) U.S. Cl.
USPC ....... 358/1.14; 358/1.15; 358/3.01; 358/3.26; 358/406; 358/474; 399/9; 399/15; 382/112

(58) Field of Classification Search
USPC ............ 358/1.9, 1.14, 1.15, 3.01, 3.06, 3.26, 358/406, 474, 504; 382/112; 399/9, 15
See application file for complete search history.

(56) References Cited

U.S. PATENT DOCUMENTS

| 5,317,368 | A  | * | 5/1994 | Shimomura et al. | ............ 399/12 |
| 6,377,758 | B1 | * | 4/2002 | OuYang et al. | ................. 399/15 |
| 7,493,056 | B2 |   | 2/2009 | Katou | |
| 7,676,703 | B2 | * | 3/2010 | Uwatoko et al. | ................ 714/48 |
| 7,965,414 | B2 | * | 6/2011 | Wu et al. | ......................... 358/1.9 |
| 8,223,350 | B2 | * | 7/2012 | Mashtare et al. | ............ 358/1.12 |
| 8,259,350 | B2 |   | 9/2012 | Wu et al. | |

(Continued)

FOREIGN PATENT DOCUMENTS

JP 2007-116670 5/2007

OTHER PUBLICATIONS

Santos-Villalobos, Hector, et al., "A Web-Based Self-Diagnosis Tool to Solve Print Quality Issues", *IS&T's NIP22: International Conference on Digital Printing Technologies*, Sep. 17, 2006; pp. 465-471.

(Continued)

*Primary Examiner* — Kimberly A Williams
(74) *Attorney, Agent, or Firm* — Staas & Halsey LLP

(57) ABSTRACT

A host apparatus, an image forming apparatus, and a diagnosis method for the image forming apparatus, the diagnosis method including: storing a printing image generated from print data according to a printing command; and generating a diagnosis image for the printing image based on the stored printing image and a defect image corresponding to a predetermined defect of the image forming apparatus.

49 Claims, 32 Drawing Sheets

U.S. PATENT DOCUMENTS

| | | | |
|---|---|---|---|
| 2003/0142985 A1* | 7/2003 | Sampath et al. | 399/9 |
| 2005/0240376 A1* | 10/2005 | Uwatoko et al. | 702/183 |
| 2006/0103899 A1* | 5/2006 | Wu | 358/504 |
| 2006/0110009 A1* | 5/2006 | Klassen et al. | 382/112 |
| 2007/0195351 A1* | 8/2007 | Mashtare et al. | 358/1.13 |
| 2007/0237529 A1 | 10/2007 | Katou | |
| 2008/0010522 A1* | 1/2008 | Uwatoko et al. | 714/23 |
| 2008/0013848 A1* | 1/2008 | Wu et al. | 382/254 |
| 2008/0137914 A1* | 6/2008 | Minhas | 382/112 |
| 2009/0185204 A1* | 7/2009 | Wu et al. | 358/1.9 |
| 2009/0262380 A1* | 10/2009 | Puigardeu et al. | 358/1.14 |
| 2010/0020361 A1 | 1/2010 | Kim et al. | |
| 2010/0124362 A1* | 5/2010 | Wu et al. | 382/112 |
| 2011/0228307 A1* | 9/2011 | Kott et al. | 358/1.14 |

OTHER PUBLICATIONS

Print Quality Troubleshooting Tool for HP Color LaserJet 4700—Home Page; http://www.hp.com/cpso-support-new/pg/4700/home.html, 2004, 2009; printed Feb. 19, 2009.

U.S. Appl. No. 12/472,676, filed May 27, 2009, Hyun-cheol Kim et al., Samsung Electronics Co., Ltd.

U.S. Office Action mailed Oct. 31, 2012 in related U.S. Appl. No. 12/472,676.

U.S. Office Action issued Jun. 21, 2012 in copending U.S. Appl. No. 12/472,676.

U.S. Office Action dated Feb. 15, 2013 issued in related U.S. Appl. No. 12/472,676.

* cited by examiner

FIG. 9A

| 1 | 1 | 0 | 0 | 0 |
|---|---|---|---|---|
| 1 | 1 | 0 | 0 | 0 |
| 1 | 0 | 1 | 1 | 1 |
| 0 | 0 | 1 | 1 | 1 |
| 0 | 0 | 1 | 1 | 1 |

FIG. 9B

| 251 | 201 | 55 | 5 | 64 |
|---|---|---|---|---|
| 216 | 145 | 111 | 36 | 121 |
| 26 | 83 | 173 | 234 | 163 |
| 12 | 59 | 197 | 248 | 211 |
| 21 | 116 | 140 | 225 | 154 |

FIG. 9C

| Img < 251 | Img < 201 | Img >= 55 | Img >= 5 | Img >= 64 |
|---|---|---|---|---|
| Img < 216 | Img < 145 | Img >= 111 | Img >= 36 | Img >= 121 |
| Img >= 26 | Img >= 83 | Img < 173 | Img < 234 | Img < 163 |
| Img >= 12 | Img >= 59 | Img < 197 | Img < 248 | Img < 211 |
| Img >= 21 | Img >= 116 | Img < 140 | Img < 225 | Img < 154 |

FIG. 9D

| 130 | 130 | 130 | 130 | 130 |
|-----|-----|-----|-----|-----|
| 130 | 130 | 130 | 130 | 130 |
| 130 | 130 | 130 | 130 | 130 |
| 130 | 130 | 130 | 130 | 130 |
| 130 | 130 | 130 | 130 | 130 |

(a) PRINTING IMAGE (b) VERTICAL WHITE STREAK DEFECT IMAGE (c) DIAGNOSIS IMAGE (a) PRINTING IMAGE (b) BANDING DEFECT IMAGE (c) DIAGNOSIS IMAGE (a) DIAGNOSIS IMAGE (b) SCAN IMAGE (c) DIFFERENCE FROM SIMILAR IMAGE (a) DIAGNOSIS IMAGE (b) SCAN IMAGE (c) DIFFERENCE FROM DIFFERENT IMAGE

HOST APPARATUS, IMAGE FORMING APPARATUS, AND DIAGNOSIS METHOD FOR IMAGE FORMING APPARATUS

CROSS-REFERENCE TO RELATED APPLICATIONS

This application is a continuation-in-part of U.S. patent application Ser. No. 12/472,676, filed on May 27, 2009, now pending, which claims all benefits accruing under 35 U.S.C. §119 from Korean Patent Application No. 2008-73624, filed on Jul. 28, 2008 in the Korean Intellectual Property Office, the disclosures of which are incorporated herein by reference.

BACKGROUND OF THE INVENTION

1. Field of the Invention

Aspects of the present invention relate to a host apparatus, an image forming apparatus, and a self-diagnosis method for the image forming apparatus.

2. Description of the Related Art

In general, an image forming apparatus (such as a printer, a facsimile, and a multi-functional device) performs printing on a print medium (such as a printing paper, a transparency, and film) of an image (such as a text and/or a picture) according to a user printing command. If any defect occurs in a printed matter while performing printing, a user may inspect a cause of the defect and fix the defect through solutions such as a help option or the like provided in the image forming apparatus, or may request a repair service for the image forming apparatus from a manufacturer.

In the case of the defect caused by a component having a limited life span, such as a developer, the image forming apparatus generally provides a basic solution to detect a remaining amount of a toner in the developer and output a message to notify a user whether to replace the developer without any other actions to be taken. However, if the defect is caused by simple problems other than the remaining amount of the toner, a user is likely to request the repair service because of insufficient information about the cause of the defect, even though the user may be able to easily fix the defect, thereby wasting time and money.

In the case of the repair service request, a manufacturer may provide a Printer Self Diagnosis System (PSDS) that can inspect the image forming apparatus remotely and fix the defect, to reduce the cost. In this case, the PSDS diagnoses information regarding the defect in a remote manner, and analyzes the type of the defect based on the diagnosis information to fix the defect occurring in the image forming apparatus.

A conventional PSDS of an image forming apparatus is designed such that a user accesses a website of a manufacturer through a communication network (such as the Internet), selects an image that most closely resembles a defect in question among printing images provided by the manufacturer, and provides a solution corresponding to the selected image to the user online.

In this way, the conventional PSDS diagnoses remotely based on printing images one-sidedly provided by a manufacturer. However, the images provided online are not actually printed images, but are images provided by a manufacturer. Furthermore, the images provided online are difficult to identify and, thus, a user may diagnose the defect incorrectly.

SUMMARY OF THE INVENTION

Aspects of the present invention provide a host apparatus, an image forming apparatus, and a diagnosis method for the image forming apparatus that generates an image for diagnosing a defect based on an image that is actually printed by a user, thereby enhancing efficiency of a diagnosis and convenience to a user. Aspects of the present invention also provide a host apparatus, an image forming apparatus, and a diagnosis method for the image forming apparatus that uses a similarity measured by comparing an actually printed image with a generated image for a diagnosis, thereby improving accuracy of the diagnosis. Aspects of the present invention further provide a host apparatus, an image forming apparatus and a diagnosis method for the image forming apparatus that diagnoses a defect by an application program on a personal computer, as well as online, thereby avoiding wasting time and money due to a repair service.

Additional aspects and/or advantages of the invention will be set forth in part in the description which follows and, in part, will be obvious from the description, or may be learned by practice of the invention.

In accordance with an example embodiment of the present invention, there is provided a diagnosis method for an image forming apparatus. Such a method includes: storing a printing image generated from print data according to a printing command; generating a diagnosis image for the stored printing image based on the stored printing image and a defect image corresponding to a predetermined defect of the image forming apparatus; and comparing the generated diagnosis image with a scan image of a printed image that is printed on a print medium according to the print data.

According to an aspect of the present invention, the method may further include displaying the generated diagnosis image.

According to an aspect of the present invention, the method may further include selecting one of a plurality of displayed diagnosis images.

According to an aspect of the present invention, the method may further include providing diagnosis information corresponding to the selected diagnosis image.

According to an aspect of the present invention, the method may further include storing a diagnosis record including the diagnosis information.

According to an aspect of the present invention, the method may further including selecting one of a plurality of stored printing images, wherein the generating of the diagnosis image may include generating the diagnosis image for the selected printing image.

According to an aspect of the present invention, the stored printing image may be regularly or irregularly deleted to maintain a predetermined number of stored printing images.

According to an aspect of the present invention, the generating of the diagnosis image may include generating a plurality of diagnosis images for a plurality of color channels, respectively.

According to an aspect of the present invention, the generating of the diagnosis image may include converting the selected printing image to correspond to a color space of the image forming apparatus, and generating the diagnosis image by synthesizing the converted printing image and the defect image.

According to an aspect of the present invention, the method may further include generating the scan image corresponding to the printing image; and displaying diagnosis results by comparing the scan image with the diagnosis image.

According to an aspect of the present invention, the displaying the diagnosis result may include displaying at least one diagnosis image having a similarity with the scan image that is higher than a predetermined similarity.

According to an aspect of the present invention, the storing the printing image may include reducing the printing image to correspond to a display part of the image forming apparatus.

According to an aspect of the present invention, the method may further include displaying a message for selecting diagnosis execution for the printing image.

According to an aspect of the present invention, the printing image may be a rendering image, a halftone image, or a capture image.

In accordance with an example embodiment of the present invention, there is provided an image forming apparatus including: an image forming part forming an image based on a printing image according to a printing command; a storage part storing a defect image corresponding to a defect occurring in the image forming apparatus; and a controller storing the printing image in the storage part, generating a diagnosis image for at least one printing image based on the stored printing image and defect image, and comparing the generated diagnosis image with a scan image of the printed image.

According to an aspect of the present invention, the image forming apparatus may further include a display part to display the diagnosis image.

According to an aspect of the present invention, the controller may reduce the printing image to correspond to the display part and stores the reduced printing image in the storage part.

According to an aspect of the present invention, the image forming apparatus may further include a user selection part for selecting any one of the displayed diagnosis images.

According to an aspect of the present invention, the display part may provide diagnosis information corresponding to the selected diagnosis image.

According to an aspect of the present invention, the controller may store a diagnosis record including the diagnosis information in the storage part.

According to an aspect of the present invention, any one of the stored printing images may be selected through the user selection part, and the controller may generate a diagnosis image for the selected printing image.

According to an aspect of the present invention, the controller may regularly or irregularly delete the stored printing image to maintain a predetermined number.

According to an aspect of the present invention, the controller may generate the diagnosis images for a plurality of color channels, respectively.

According to an aspect of the present invention, the controller may convert the selected printing image to correspond to a color space of the image forming apparatus, and generate the diagnosis image by synthesizing the converted printing image and the defect image.

According to an aspect of the present invention, the image forming apparatus may further including a scanning part scanning the scan image corresponding to the printing image, the controller controlling the displaying part to diagnosis results by comparing the scan image with the diagnosis image According to an aspect of the present invention, the display part may display at least one diagnosis image having high similarity with the scan image.

According to an aspect of the present invention, the display part may display a message for selecting diagnosis execution for the printing image.

According to an aspect of the present invention, the controller may decode the printing image into a halftone image, and convert the halftone image into a contone image.

In accordance with an example embodiment of the present invention, there is provided a host apparatus connectable with an image forming apparatus, including: an image processing part generating a printing image according to a printing command; a storage part storing a defect image corresponding to a defect occurring in the image forming apparatus; and a controller storing the printing image in the storage part, controlling the image processing part to generate a diagnosis image for at least one printing image based on the stored printing image and defect image, and comparing the generated diagnosis image with a scan image of a printed image corresponding to the printing image.

According to an aspect of the present invention, the host apparatus may further include a display part displaying the generated diagnosis image.

According to an aspect of the present invention, the host apparatus may further include a user selection part for selecting any one of the displayed diagnosis images.

According to an aspect of the present invention, the display part may provide diagnosis information corresponding to the selected diagnosis image.

According to an aspect of the present invention, the controller may store a diagnosis record including the diagnosis information in the storage part.

According to an aspect of the present invention, any one of the stored printing images may be selected through the user selection part, and the controller may generate a diagnosis image for the selected printing image.

According to an aspect of the present invention, the controller may regularly or irregularly delete the stored printing image to maintain a predetermined number.

According to an aspect of the present invention, the controller may generate the diagnosis images for a plurality of color channels, respectively.

According to an aspect of the present invention, the controller may convert the selected printing image to correspond to a color space of the image forming apparatus, and generate the diagnosis image by synthesizing the converted printing image and the defect image.

According to an aspect of the present invention, the host apparatus may further include a communication part communicating with the image forming apparatus, the controller receiving the scan image corresponding to the printing image through the communication part, and displaying diagnosis results from comparison between the received scan image and the diagnosis image.

According to an aspect of the present invention, the display part may display at least one diagnosis image having high similarity with the scan image.

According to an aspect of the present invention, the display part may display a message for selecting diagnosis execution for the printing image.

According to an aspect of the present invention, the printing image may include one of a rendering image, a halftone image and a capture image.

In accordance with still another example embodiment of the present invention, there is provided a host apparatus to diagnose a defect in an image forming apparatus. Such a host apparatus includes: an image processing part to generate a printing image from print data; and a controller to control the image processing part to generate a diagnosis image for the printing image based on the printing image and a defect image corresponding to a predetermined defect of the image forming apparatus.

In accordance with another example embodiment of the present invention, there is provided an image forming apparatus to diagnose a defect therein, including: an image processing part to process a printing image from print data; and a controller to control the image processing part to generate a diagnosis image for the printing image based on the printing image and a defect image corresponding to a predetermined defect of the image forming apparatus.

In accordance with another example embodiment of the present invention, there is provided a diagnosis method for an image forming apparatus, including: processing a printing image generated from print data; and generating a diagnosis image for the printing image based on the printing image and a defect image corresponding to a predetermined defect of the image forming apparatus.

In accordance with yet another example embodiment of the present invention, there is provided a system to diagnose a defect, including: an image forming apparatus to receive and to print print data; and a host apparatus to diagnose a defect in an image forming apparatus. Such a host apparatus includes: an image processing part to generate a printing image from the print data according, a storage part to store a defect image corresponding to a predetermined defect of the image forming apparatus, and a controller to control the image processing part to generate a diagnosis image for the printing image based on the printing image and the defect image.

In accordance with another example embodiment of the present invention, there is provided a diagnosis method to determine defects of an image forming apparatus, the diagnosis method including: storing, by the image forming apparatus, a printing image generated from print data according to a printing command; generating, by the image forming apparatus, a diagnosis image for the stored printing image based on the stored printing image and a defect image corresponding to a predetermined defect of the image forming apparatus; printing, by the image forming apparatus, an image onto a print medium according to the print data; scanning, by the image forming apparatus, the printed image to generate a scan image; and comparing, by the image forming apparatus, the generated diagnosis image with the scan image.

In accordance with another example embodiment of the present invention, there is provided a diagnosis method to determine defects of an image forming apparatus, the diagnosis method including: storing, by a host apparatus, a printing image generated from print data according to a printing command; generating, by the host apparatus, a diagnosis image for the stored printing image based on the stored printing image and a defect image corresponding to a predetermined defect of the image forming apparatus; receiving, by the host apparatus, a scan image of a printed image that is printed by the image forming apparatus on a print medium according to the print data; and comparing, by the host apparatus, the generated diagnosis image with the received scan image.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIGS. 9A through 9D are diagrams illustrating a halftone image conversion according to an example embodiment of the present invention;

DETAILED DESCRIPTION OF THE EMBODIMENTS

Figure 1:
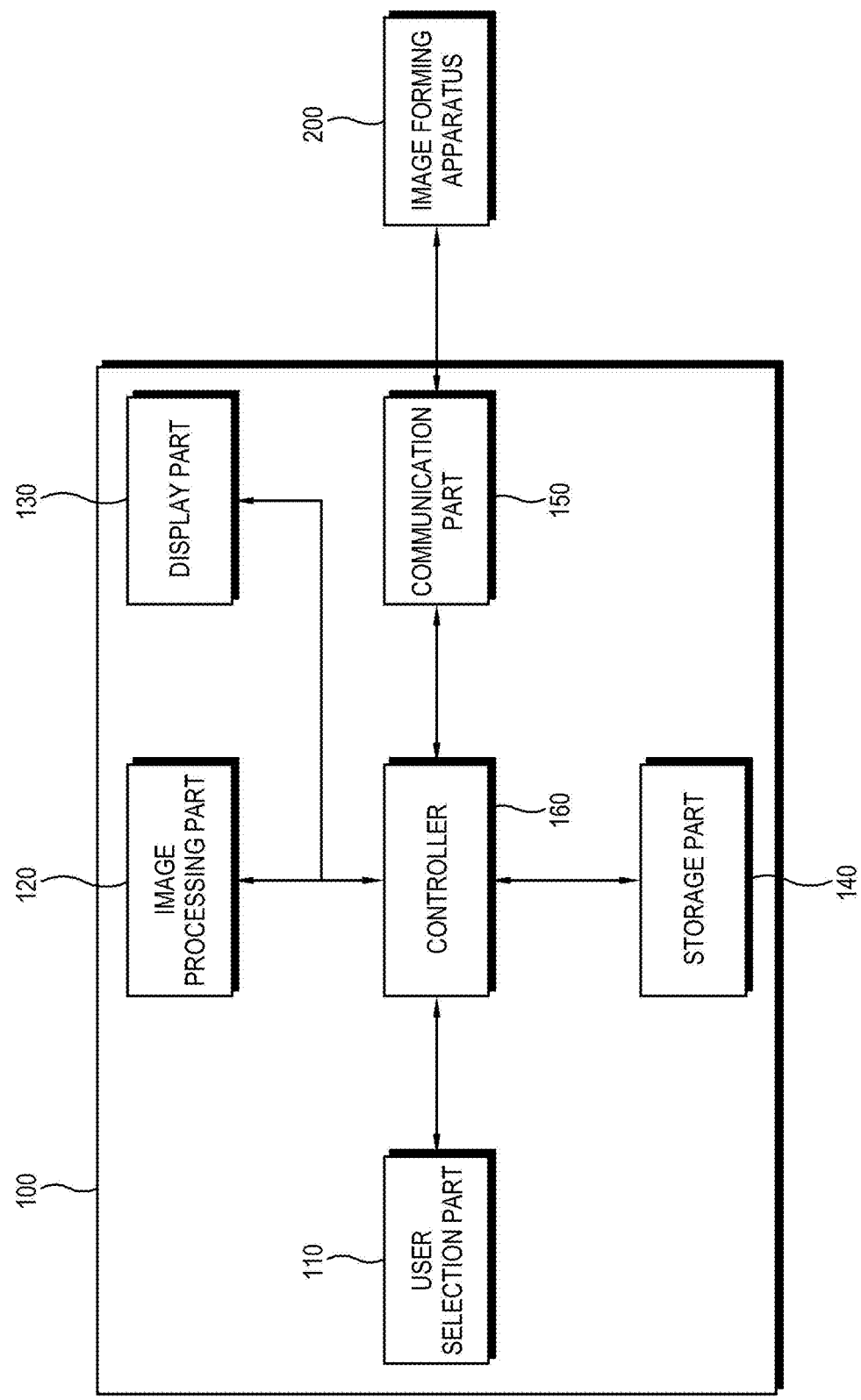
FIG. 1 is a block diagram illustrating a host apparatus according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a host apparatus 100 according to an example embodiment of the present invention. The host apparatus 100 may be a personal computer that provides print data (such as texts, images, photographs, and combinations thereof) to an image forming apparatus 200 that prints the print data on a print medium (such as paper, transparencies, and film), and controls the image forming apparatus 200.

The host apparatus 100 is connected to at least one image forming apparatus 200, and may include a Printer Self Diagnosis System (PSDS) for the connected image forming apparatus 200. The PSDS may be realized by executing a printer driver installed in the host apparatus 100 or a separate application program. For example, the printer driver or the application program for the PSDS of at least one image forming apparatus 200 is installed in the host apparatus 100.

Referring to FIG. 1, the host apparatus 100 includes a first user selection part 110, an image processing part 120, a first display part 130, a first storage part 140, a first communication part 150, and a controller 160.

The first user selection part 110 enables a user to select whether to execute a PSDS for the image forming apparatus 200. Specifically, if the host apparatus 100 receives a printing command for the image forming apparatus 200, the controller 160 may select execution of the PSDS through, for example, a user input via the first user selection part 110. Here, the printing includes printing for a copy after scanning a document, printing for received fax data, and printing for print data received from an outside source through the host apparatus including a server or print data stored inside (such as in a hard disk drive, HDD) of the image forming apparatus 200 or outside (USB memory). The first user selection part 110 may include a mouse, a keyboard, etc., and/or may include a user interface (UI) (hereinafter, also referred to as a "graphic user interface (GUI)") generated by executing a printer driver and displayable through the first display part 130. That is, if the host apparatus 100 receives a printing command from a user, the host apparatus 100 calls a printer driver or a separate application program, and provides a UI to inspect whether a printed matter from the image forming apparatus 200 has a defect for the user. If the printed matter has a defect, the user may select execution of a PSDS for the image forming apparatus 200 through the UI. If the user selects execution of the PSDS for the image forming apparatus 200, the host apparatus 100 selects, through the first user selection part 110, a printing image stored in the first storage part 140 or a diagnosis image generated by the image processing part 120.

Furthermore, the host apparatus 100 may perform a PSDS by executing an application program or a printer driver so that a user can perform the PSDS through the first user selection part 110 irrespective of receipt of a printing command.

The image processing part 120 generates a printing image according to a printing command. When executing a PSDS, the image processing part 120 generates a diagnosis image for at least one printing image based on the printing image and a defect image stored in the first storage part 140, or in an external storage unit (such as a flash memory). The generated printing image and diagnosis image may be stored in the first storage part 140, or in an external storage unit (such as a flash memory).

Figure 2:
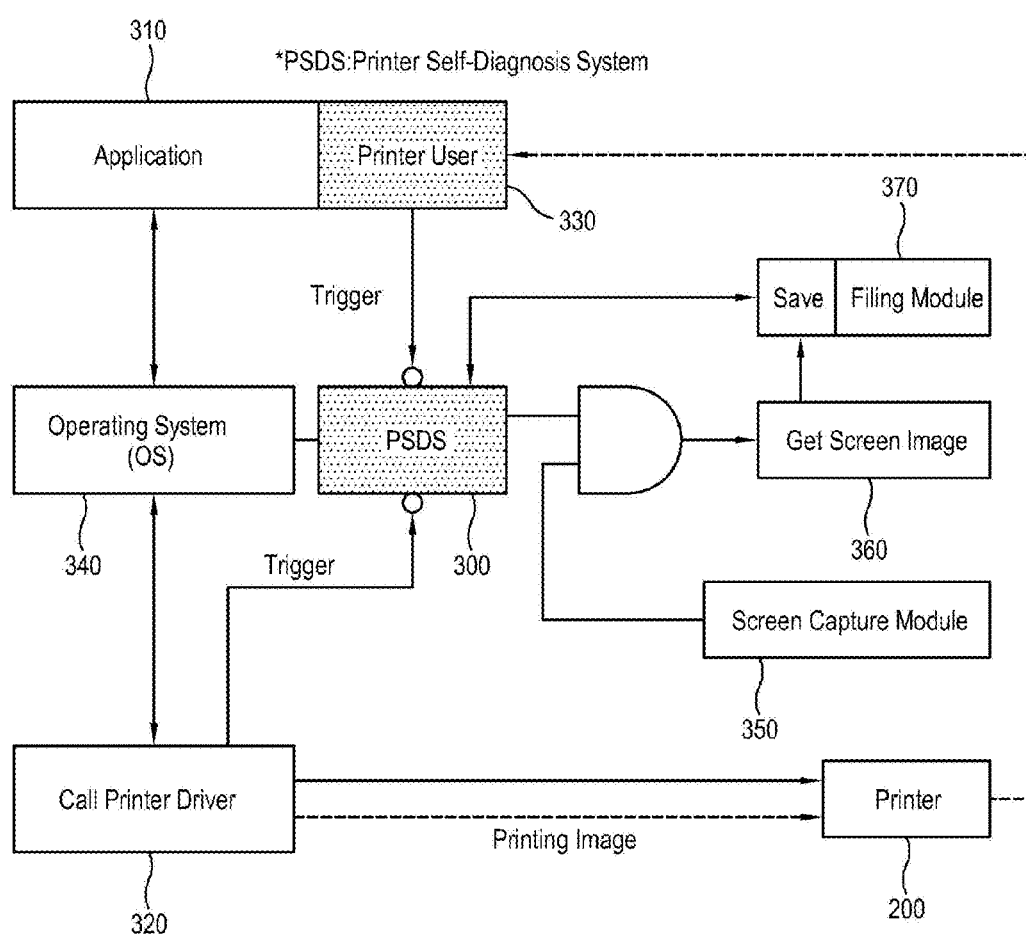
FIGS. 2 through 8 are diagrams illustrating printing images generated according to an example embodiment of the present invention.

FIGS. 2 through 8 are diagrams illustrating printing images stored according to an example embodiment of the present invention. As described above, the host apparatus 100 may perform the PSDS 300 by executing an application program 310 or a printer driver 320 via an operating system (OS) 340 so that a user 330 can perform the PSDS 300 through the first user selection part 110 irrespective of receipt of a printing command. Referring to FIG. 2, a screen capture module 350 of the image processing part 120 may generate a capture image 360 for a screen displayed on the first display part 130 as a printing image according to a printing command. For example, the capture image 360 may be generated by capturing the whole monitor screen that a user 330 currently views through a "Print Screen" button on a keyboard, or by capturing a region on a screen designated by a user 330 through a separate mouse capture application program (for example, SNAG-IT). Furthermore, a filing module 370 (i.e., the first storage part 140) may save the capture image 360.

Figure 3:
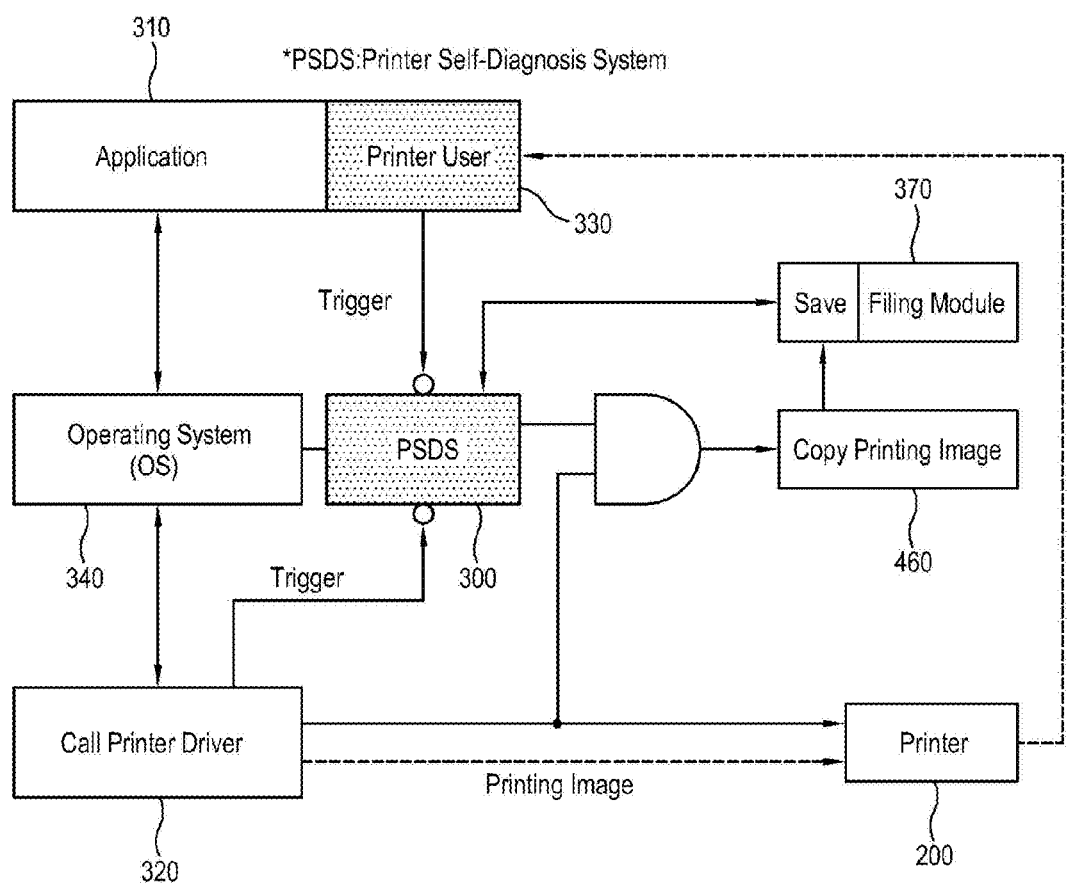

As shown in FIG. 3, the image processing part 120 generates a printing image 460 in a printer language (such as Graphics Device Interface (GDI), Printer Command Language (PCL) and PostSript (PS)) according to a printing command. The generated printing image 460 is transmitted to the image forming apparatus 200 for printing. The host apparatus 100 copies the printing image 460 transmitted to the image forming apparatus 200 and stores the copied printing image 460 in the first storage part 140 (i.e., the filing module 370), or an external storage unit (such as a flash memory).

Figure 4:
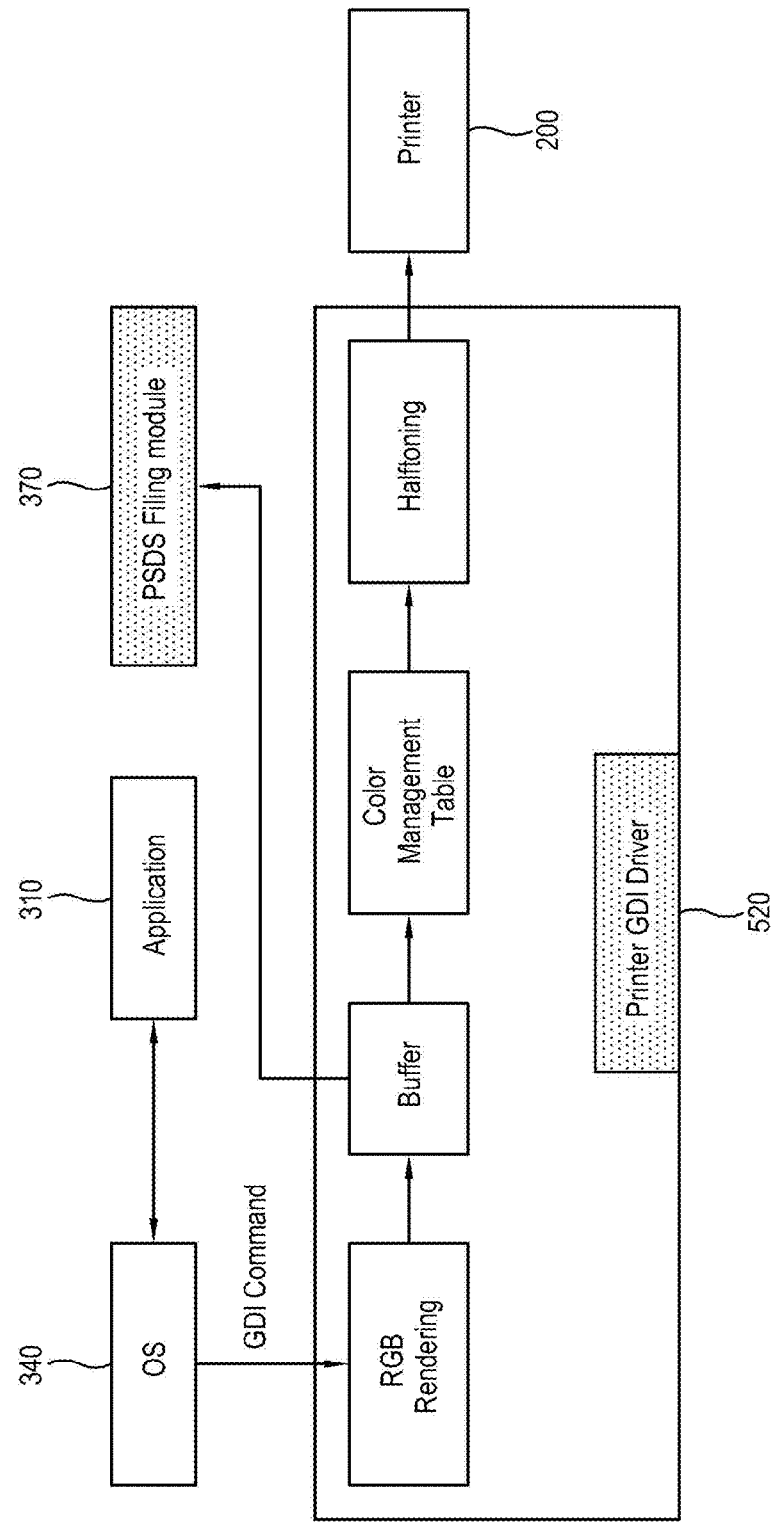
Figure 5:
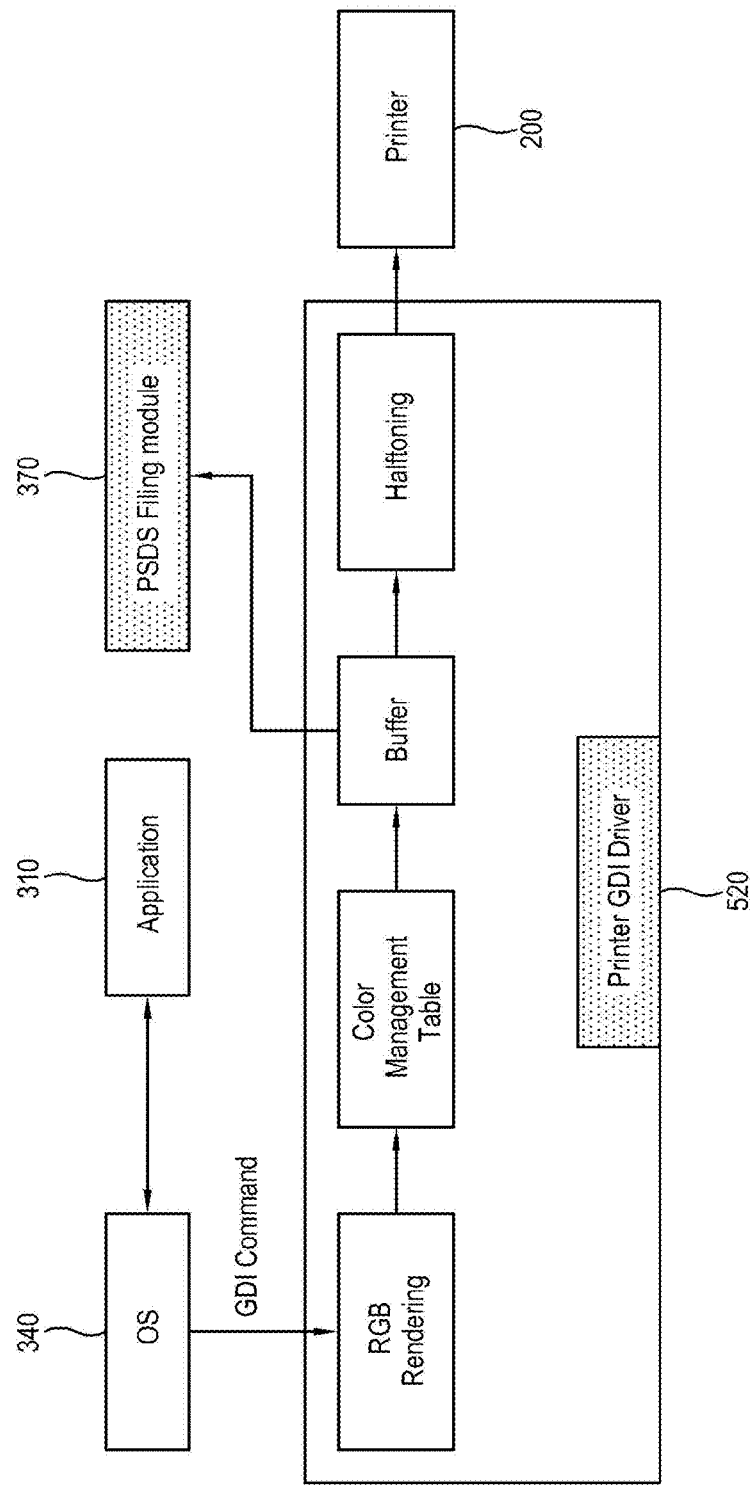
Figure 6:
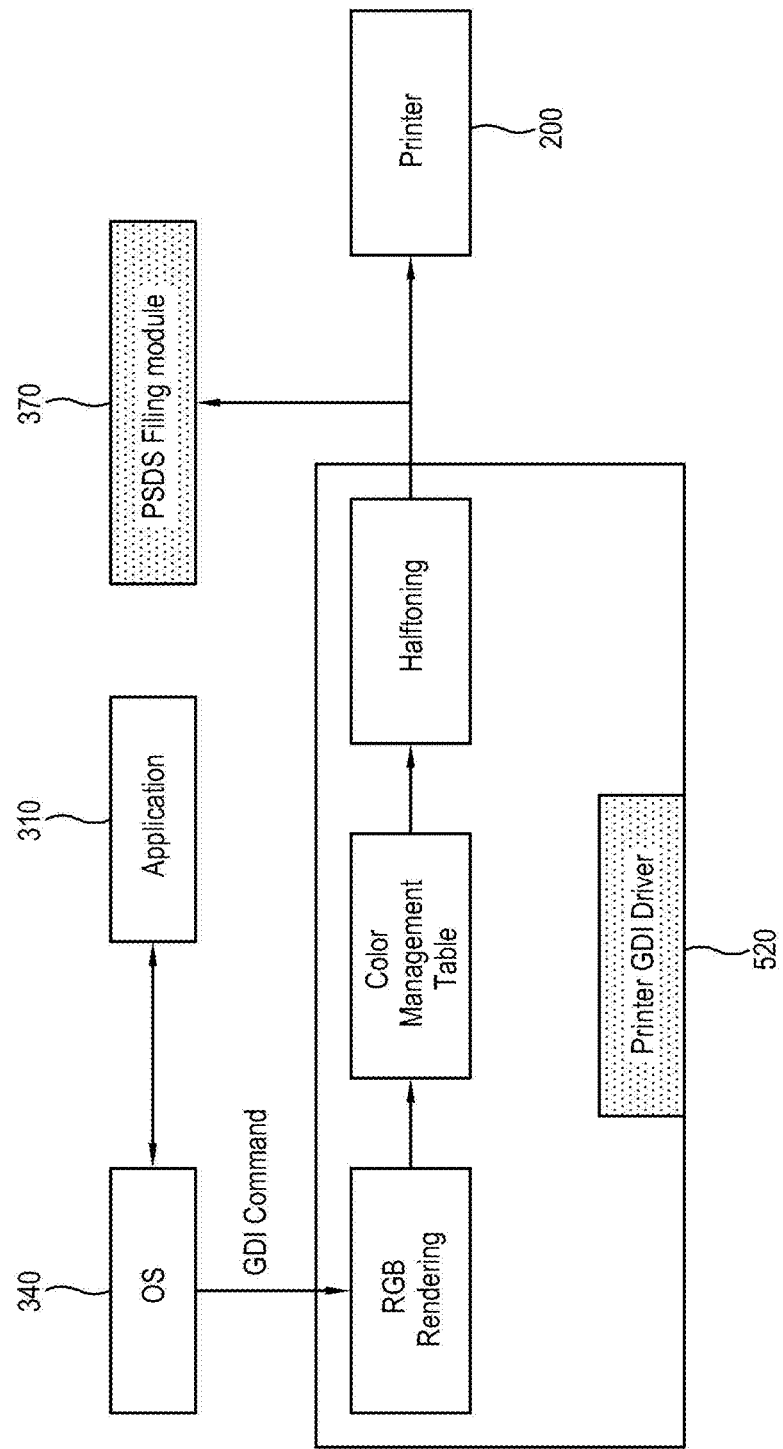

FIGS. 4 to 6 illustrate a case where a GDI driver 520 is used. Referring to FIGS. 4 to 6, the printing image may include a rendering image or a halftone image. Specifically, as shown in FIG. 4, the host apparatus 100 may store an RGB rendering image as a printing image, or may store a CMYK rendering image converted from an RGB rendering image as a printing image. In this respect, the controller 160 (or OS 340) may control the image processing part 120 to convert an RGB printing image into a CMYK image or to convert a CMYK printing image into an RGB image to correspond to a color space of a diagnosis image to be described later.

Further, as shown in FIG. 6, the host apparatus 100 may store a halftone image as a printing image. If a printing image is a halftone image, the controller 160 (or OS 340) may control the image processing part 120 to convert the halftone image into an RGB image.

FIGS. 9A through 9D are diagrams illustrating a halftone image conversion according to an example embodiment of the present invention. If a printing image is a halftone image, the halftone image can be converted into an RGB rendering image (hereinafter, referred to as a contone image) of 8 bits. This conversion from a halftone image to a contone image is called H2C.

Figure 9A:
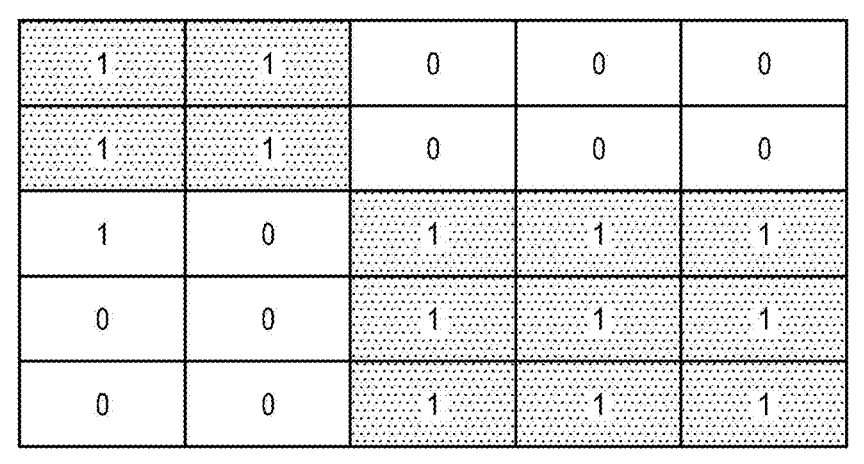

More specifically, referring to FIG. 9A, if the host apparatus 100 uses a GDI driver 520 and a printing image is a halftone image (or a print (Ready-to-Print) file of a PRN format) of 8 bits or less (for example, 1 bit, 2 bits or 4 bits), the controller 160 reads a halftone table (see FIG. 9B) used for conversion of the corresponding halftone image. In this respect, a used halftone algorithm may be as follows:

---

If Image Pixel Value(8bit) < Halftone Threshold Value
Then, Dot "ON" = "1"
else Dot "OFF" = "0"

---

By way of example, it is assumed that the halftone image has an image pixel value of 8 bits. Referring to FIG. 9C, the lowest threshold is 140 in a pixel with halftone image data being 1, and the highest threshold value is 121 in a pixel with halftone image data being 0. Therefore, in the example embodiment, a contone image value of 8 bits satisfies the following:

$$121 < 8 \text{ bit image pixel value} < 140$$

Accordingly, a halftone image of 1 bit in FIG. 9A is restored as a contone image of 8 bits as shown in FIG. 9D. The restored image pixel value may be determined as (121+140)/2.

In the above H2C restoring process, a region having the same pixel value of an image to be restored is the same as a cell size of a halftone table (i.e., a region in which threshold values do not overlap each other with respect to a dot center during halftoning or dithering). Moreover, the restored contone image may be more or less different from an RGB rendering image of 8 bits before halftoning according to a resolution and a cell size of the halftone table (i.e., the level of halftone gradation (printing resolution)).

Figure 7:
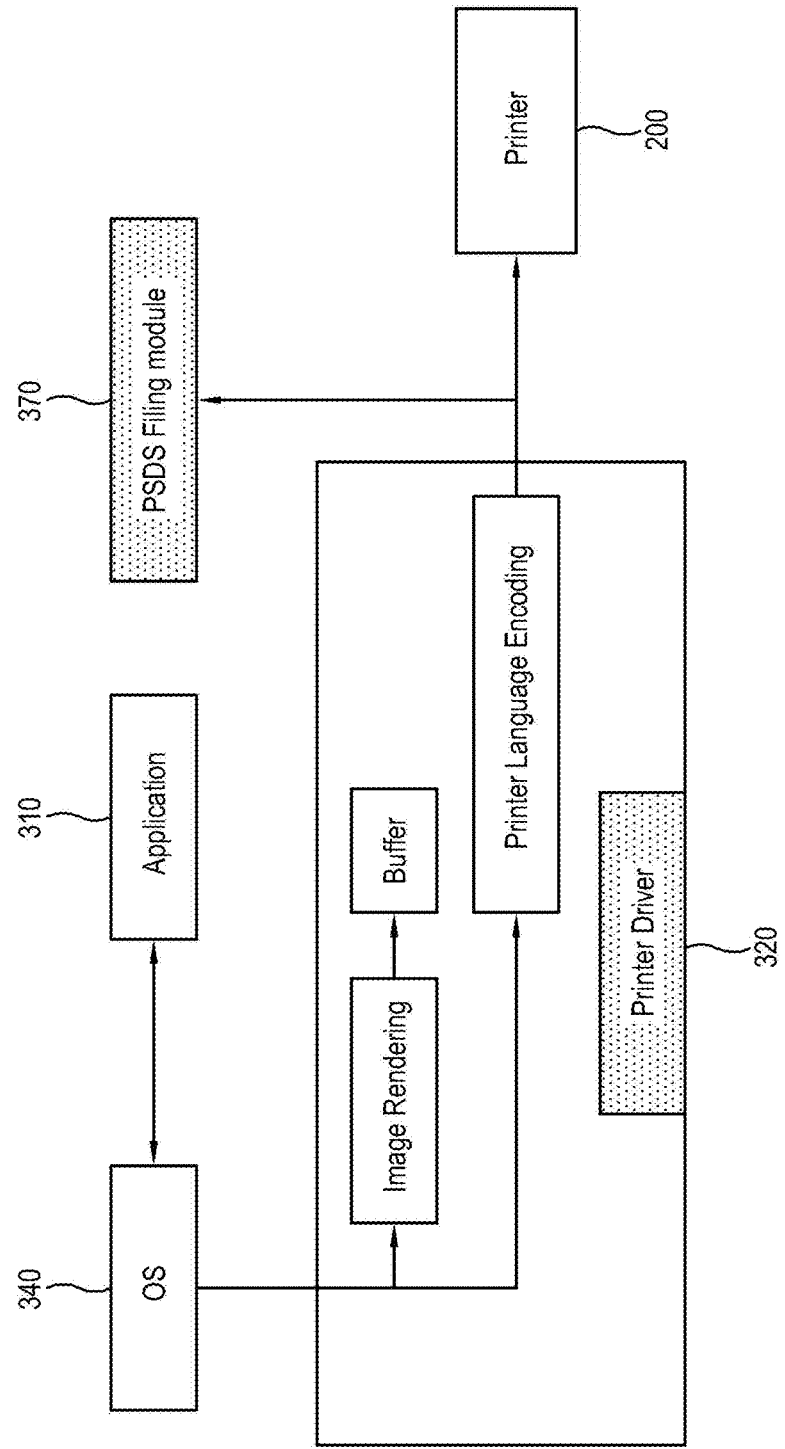
Figure 8:
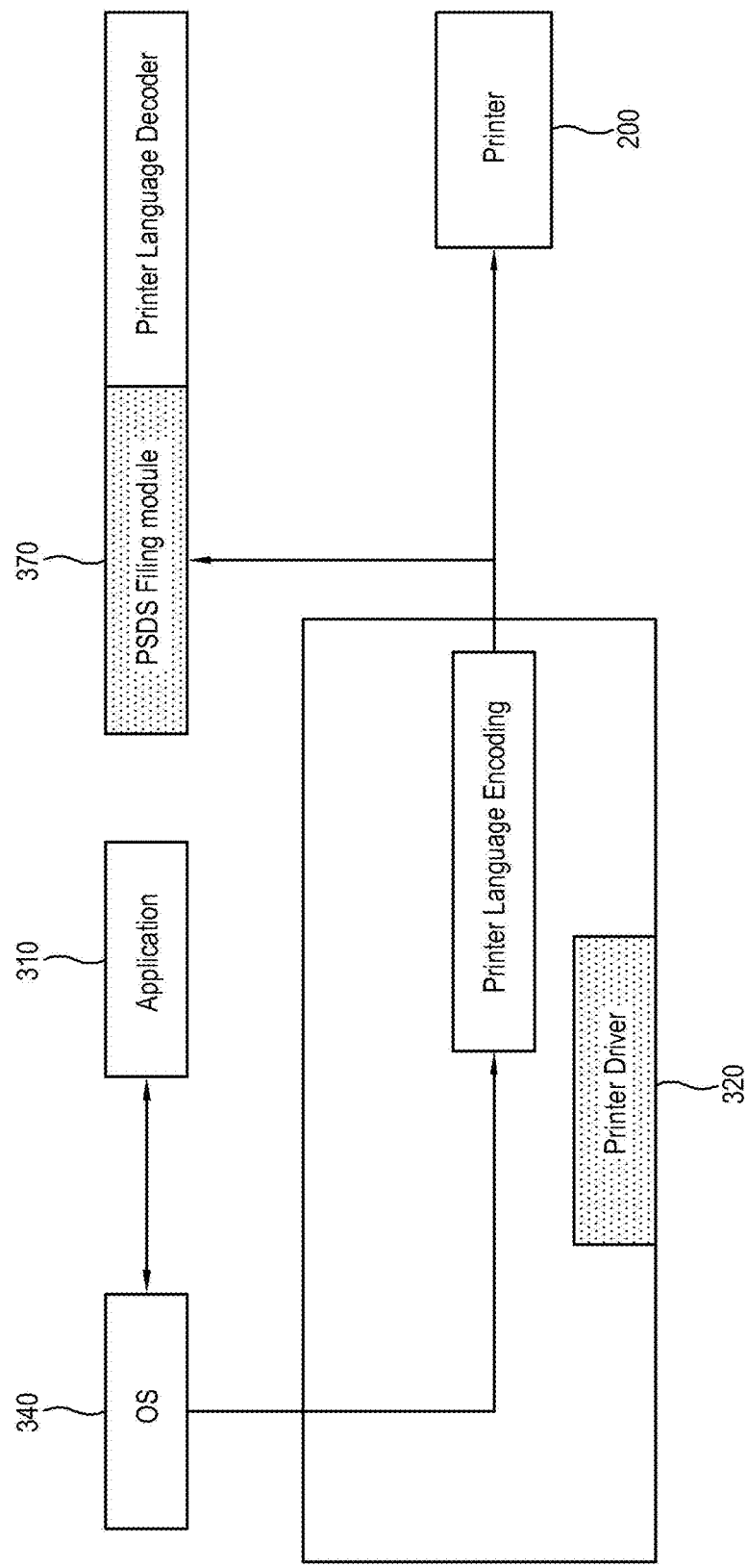
Figure 10A:
FIGS. 10A through 11C are diagrams illustrating diagnosis images generated according to an example embodiment of the present invention.
Figure 10B:
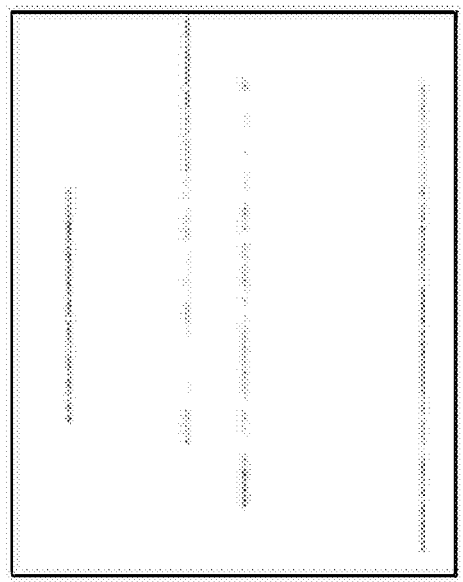
Figure 10C:
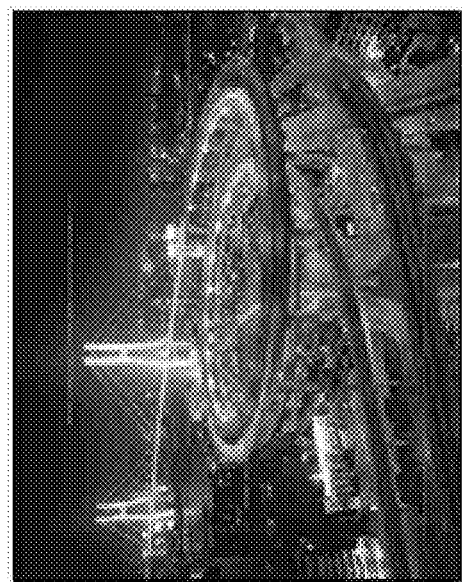

It is understood that aspects of the present invention are not limited to the GDI printer language, as described above. For example, according to other aspects, the host apparatus 100 may use a printer language such as PCL and PS, instead of GDI, to provide a printing image for the image forming apparatus 200. In particular, the host apparatus 100 may store an image before encoding by a printer language as a printing image as shown in FIG. 7, or may store an image encoded by a printer language as a printing image as shown in FIG. 8. In the case that a printing image is an encoded image, a decoding process for the printing image is performed, as shown in FIG. 8.

As stated above, the image processing part 120 generates a diagnosis image for a printing image based on the printing image and a previously stored defect image. FIGS. 10A through 10C and 11A through 11C are diagrams illustrating diagnosis images generated according to an example embodiment of the present invention. More specifically, the controller 160 controls the image processing part 120 to generate a diagnosis image (see FIG. 10C) based on a printing image (see FIG. 10A) and a defect image (see FIG. 10B). As an example, the defect image (see FIG. 10B) corresponds to vertical white streaks generated when foreign substances are present on a developing roller or a laser scanning unit (LSU) of the image forming apparatus 200.

Figure 11A:
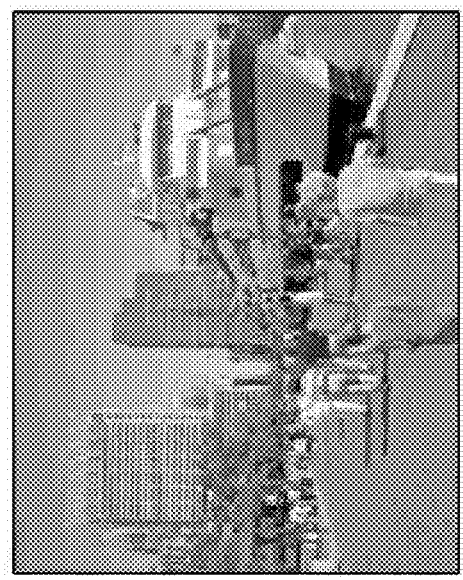
Figure 11B:
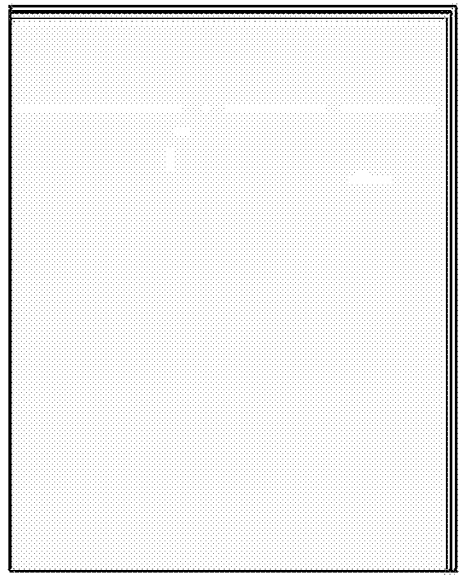

Similarly, the controller 160 controls the image processing part 120 to generate a diagnosis image (see FIG. 11C) based on a printing image (see FIG. 11A) and a defect image (see FIG. 11B). The defect image (see FIG. 11B) corresponds to banding or jitter of an image that may result from excessive speed variation of a photosensitive medium, or the like.

In generating such a diagnosis image, the controller 160 may control the image processing part 120 to generate a diagnosis image of an RGB color space by synthesizing a printing image of the RGB color space and a defect image, or to generate a diagnosis image of a CMYK color space by synthesizing a printing image of the CMYK color space and a defect image. If a diagnosis image is generated in the CMYK color space (i.e., a color space of the image forming apparatus 200 is a CMYK color space), a diagnosis image similar to a defect actually occurring due to physical causes can be generated.

For example, in order to generate a diagnosis image based on a banding defect occurring in a K-developing roller corresponding to a black toner in the image forming apparatus 200 having the CMYK color space, if a printing image corresponds to an RGB color space, the controller 160 controls the image processing part 120 to convert the printing image to correspond to the CMYK color space using an RGB2CMYK color table. Furthermore, the controller 160 controls the image processing part 120 to synthesize and merge a printing image of a K-plane and a previously stored defect image to correspond to the CMYK color space. If diagnosis images are generated for a plurality of color channels in this way, it can be determined in which developing roller the defect occurred among the plurality of developing rollers. Moreover, it is understood that the conversion process from RGB to CMYK can be omitted in aspects of the present invention if a printing image is stored to correspond to the CMYK color space.

The diagnosis image generated to correspond to the CMYK color space is converted to correspond to a color space (for example, RGB color space) displayable in the host apparatus 100. In this respect, the controller 160 may use a previously stored profile for matching with the image forming apparatus 200 and an output color in the first display part 130 through which the diagnosis image is displayed.

It is understood that aspects of the present invention are not limited to the above-described RGB2CMYK color table. For example, the host apparatus 100 may use a general RGB2CMYK conversion method such as Under Color Removal (UCR) for printing image conversion, instead of the RGB2CMYK color table. An example of the general RGB2CMYK conversion is as follows:

```
// %% Value Range : CMYK values = [0.0, 1.0] && %%
Where RGB values = [0, 255]
c = 1.0 − (r/255.0); m = 1.0 − (g/255.0); y = 1.0 − (b/255.0);
var_K = 1.0;
if (c < var_K) var_K = c;
if (m < var_K) var_K = m;
```
-continued
```
if (y < var_K) var_K = y;
if (var_K == 1) {c = 0.0; m = 0.0; y = 0.0;}
else {
c = (c − var_K) / (1.0 − var_K);
m = (m − var_K) / (1.0 − var_K);
y = (y − var_K) / (1.0 − var_K);} k = var_K;
```

An example of a CMYK2RGB conversion method is as follows:
```
//%% Value Range: CMYK values=[0.0, 1.0] && %%
Where RGB values=[0, 255]
c=(c*(1.0−k)+k); m=(m*(1.0−k)+k); y=(y*(1.0−k)+k);
R=(1.0−c)*255.0; G=(1.0−m)*255.0; B=(1.0−y)*255.0;
```

Figure 12:
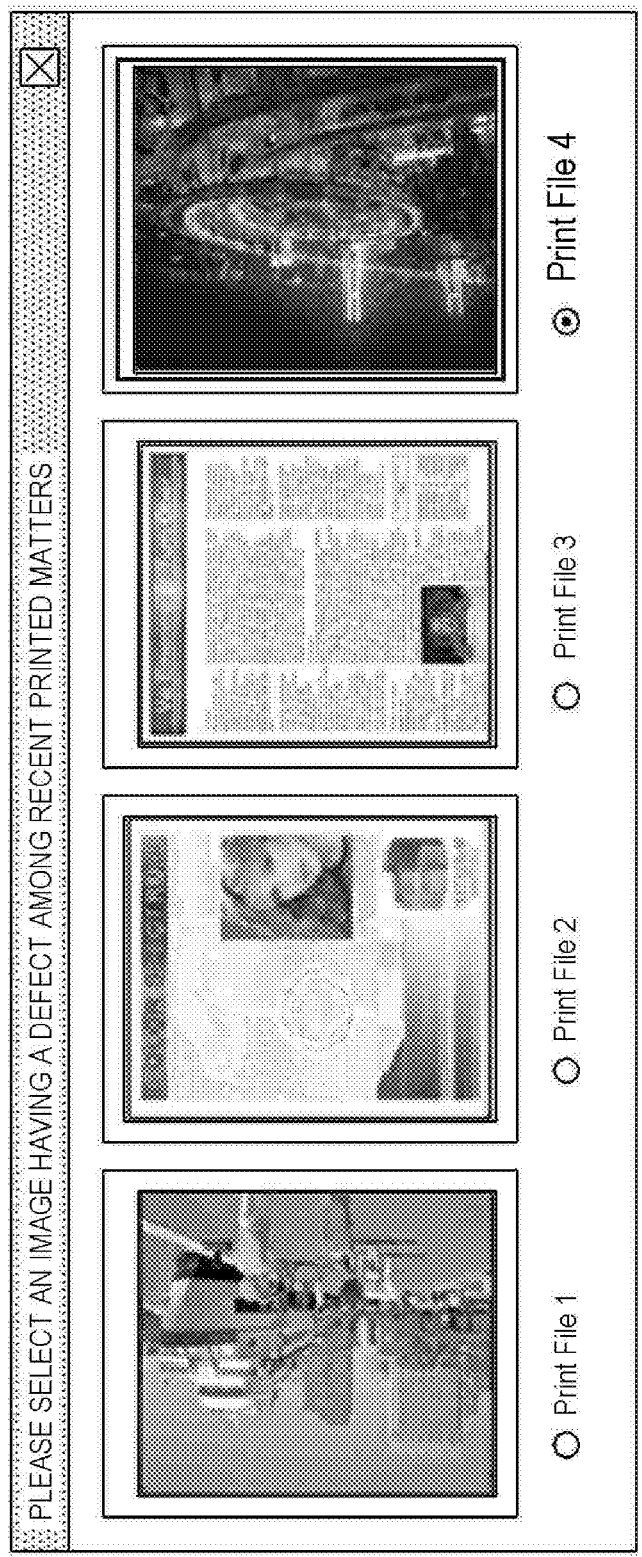
FIG. 12 illustrates printing images displayed according to an example embodiment of the present invention.
Figure 13:
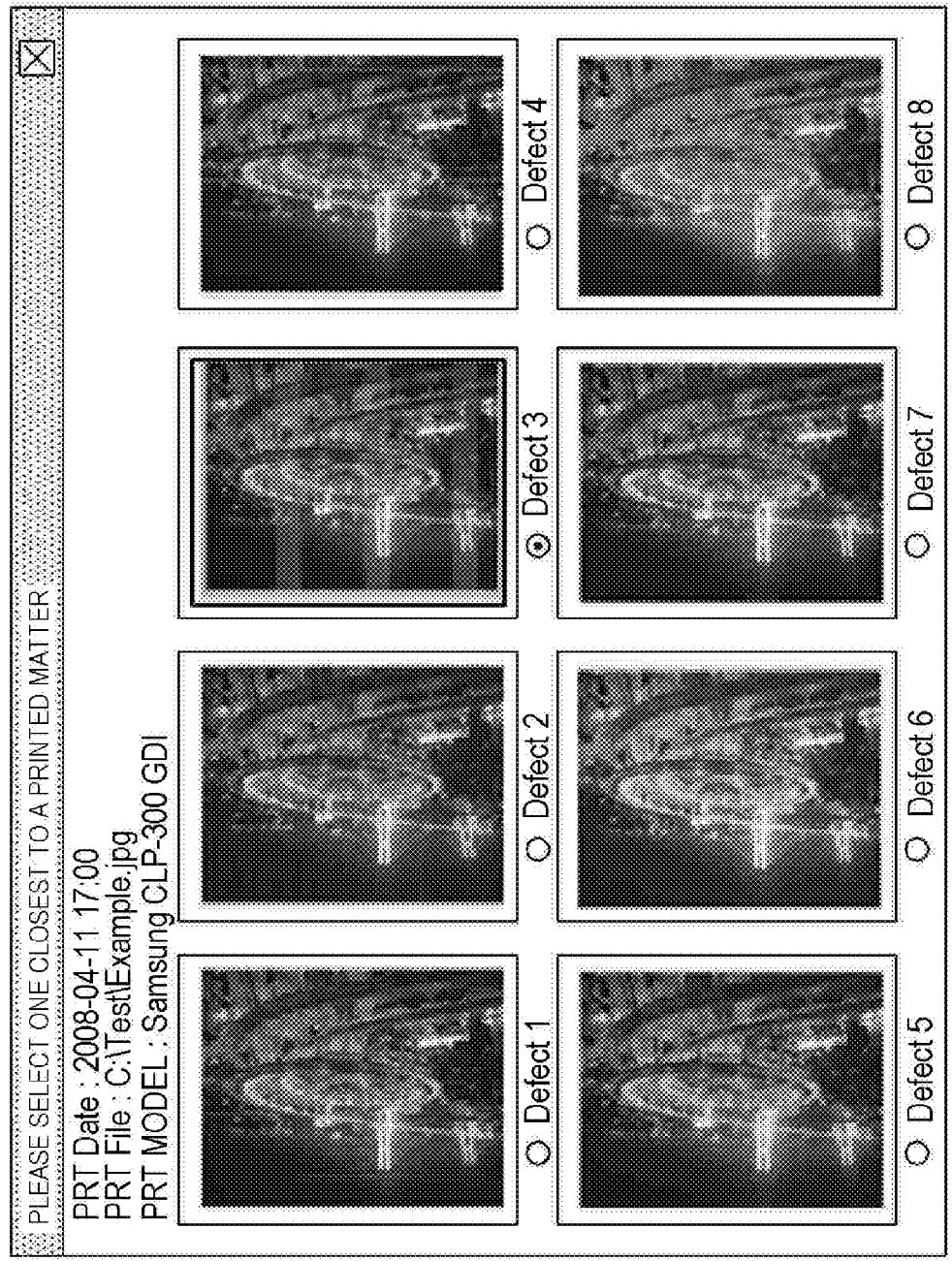
FIGS. 13 and 14 illustrate diagnosis images displayed according to an example embodiment of the present invention.

The first display part 130 displays a stored printing image, a stored defect image, and a generated diagnosis image to a user. In this respect, the first display part 130 may display a UI to select a printing image and a diagnosis image. FIG. 12 illustrates printing images displayed according to an example embodiment of the present invention, and FIGS. 13 and 14 illustrate diagnosis images displayed according to an example embodiment of the present invention.

As shown in FIG. 12, if a PSDS is selected for the image forming apparatus 200 through the first user selection unit 110, the controller 160 controls the first display part 130 to display printing images stored in the first storage part 140 (or externally). In this respect, the number of the displayed printing images may be set by a user or may be set as a default value. If any one of the displayed printing images is selected through the first user selection part 110, the controller 160 controls the first display part 130 to display diagnosis images generated according to the selected printing image and defect images stored in the first storage part 140.

Figure 14:
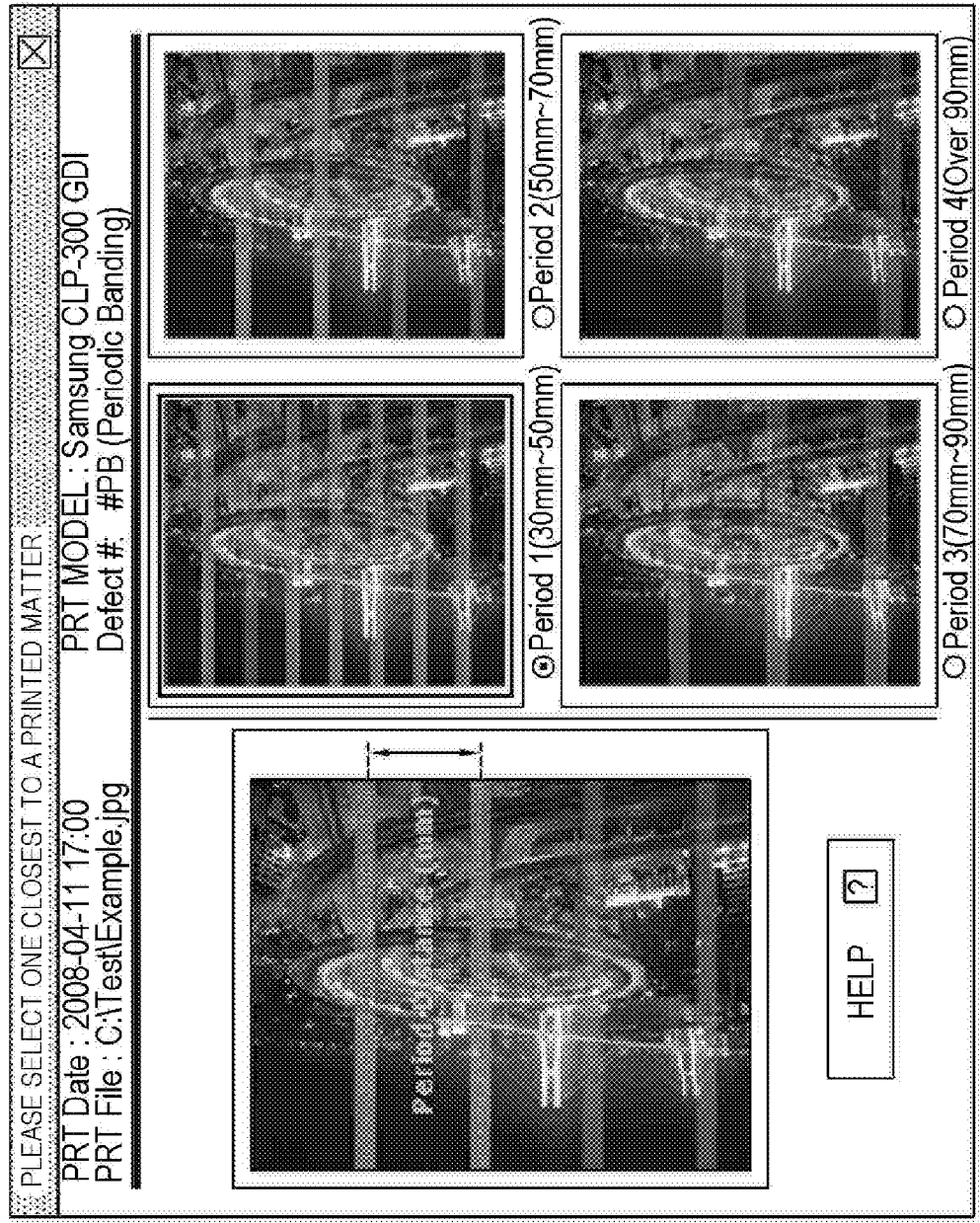

If a displayed diagnosis image is selected through the first user selection part 110, the first controller 160 may control the first display part 130 to display diagnosis information on the selected diagnosis image or to display a more detailed diagnosis image for the selected diagnosis image, as shown in FIG. 14. Alternatively, the controller 160 may control the first display part 130 to display both the diagnosis image and the diagnosis information on the diagnosis image, as shown in FIG. 14.

The displayed diagnosis information may include: information about a document (such as an instruction manual), a moving picture, an animation, etc. from which a user can easily learn a solution to the defect (e.g., the document may advise a user to replace consumable commodities, clean the interior, upgrade a firmware or a driver, and so on); a phone number, a map and a website address of a department (manufacturer, service provider, or seller of the consumable commodities) in charge of defect solution; a web-page link that a user can access for an online defect solution; an e-mail address, an e-phone number, and/or a phone number of personnel in charge of repair service; and/or the like. Furthermore, a user may be presented with a solution to the defect (e.g., auto registration, etc.) that can be fixed by improving the process of the image forming apparatus 100.

Also, in the case of the detect that cannot be directly fixed by a user (e.g., damage to main components such as a circuit board, a power supply, etc.), the diagnosis information may include: a message instructing a user to not perform disassembling and assembling; information (e.g., a phone number, a map, etc., of a service provider) for a quick repair service; and/or the like.

The first display part 130 may, although not necessarily, be a TFT-LCD and a driving part (not shown) for driving the TFT-LCD. The first storage part 140 may include an internal storage medium such as an HDD, or an external or portable storage medium such as a universal serial bus (USB) memory and a memory card (memory stick, compact flash (CF) card, multi-media card (MMC)). Accordingly, the first storage part 140 stores the printing image, the defect image, and/or a scan image (to be described later). Specifically, if a printing command is input by a user, the controller 160 stores a corresponding printing image in the first storage part 140. The stored printing image may be a rendering image, a halftone image, or a capture image. Furthermore, the rendering image may correspond to an RGB or CMYK color space. Also, the controller 160 may store the printing image in a default position (for example, an installation position of a printer driver such as C: \WINDOWS\system32\spool or C: WINDOWS\system32\spool\drivers\w32×86\3\temp) or a position selected by a user. Here, the first controller 160 may control the image processing part 120 to generate a thumbnail image of the printing image and/or the diagnosis image, and the first storage part 140 to store the generated thumbnail image together with the printing image and/or the diagnosis image.

The stored printing image may be deleted regularly or irregularly to maintain a predetermined number. That is, if a new printing image is generated according to a printing command, the controller 160 may regularly or irregularly delete previous printing images corresponding to previously performed printing operations to maintain the predetermined number of printing images stored in the first storage part 140. For example, if a predetermined number of printing images to be stored is five, and the first storage part 140 stores five previous printing images, the controller 160 deletes a printing image corresponding to the oldest printing operation from the first storage part 140 and stores a printing image generated according to a new printing command if the new printing command is received. Accordingly, the five printing images starting from the newest printing image can be sequentially stored in the first storage part 140 by irregular deletion, to thereby maintain the predetermined number of printing images.

However, it is understood that aspects of the present invention are not limited thereto. For example, the controller 160 may periodically delete a printing image when a predetermined time elapses after performing printing for the printing image stored in the first storage part 140. Furthermore, the stored printing image may be deleted after a specific time preset in the host apparatus 100, or may be deleted by selection of a user. In this way, recent printing images can be maintained in the first storage part 140. Moreover, a number of the printing images stored in the first storage part 140 may be set according to the capacity of the first storage part 140 or may be set by a user. The capacity of the first storage part 140 may vary depending on the number, size, resolution, and/or the like of stored printing images.

The first storage part 140 also stores defect images corresponding to defects that may occur in the image forming apparatus 200. The defect images may be stored according to predetermined defect categories.

The first storage part 140 may also store a diagnosis record including diagnosis information corresponding to a diagnosis image generated based on a printing image and a defect image and a selected diagnosis image. The diagnosis image may correspond to an RGB or a CMYK color space. The stored diagnosis record may be used when a similar defect occurs later in the image forming apparatus 200 or when desired by a manager or a user.

The first communication part 150 transmits a printing image to the image forming apparatus 200 according to a printing command. The first communication part 150 may be a wired and/or wireless communication module, such a USB port, an infrared port, a Bluetooth port, etc.

The first controller 160 controls the overall operations of the host apparatus 100. That is, the first controller 160 stores a printing image generated according to a printing command in the first storage part 140, and controls the image processing part 120 to generate a diagnosis image based on a stored printing image and a stored defect image when execution of PSDS is selected.

As shown in FIG. 12, the first controller 160 may display stored printing images on the first display part 130 as a user selectable UI. If a user selects a printing image on the displayed UI via the first user selection part 110, the first controller 160 controls the image processing part 120 to generate a diagnosis image based on the selected printing image and a defect image stored in the first storage part 140. Furthermore, the first controller 160 may display the generated diagnosis image and/or diagnosis information on the first display part 130, as shown in FIGS. 13 and 14.

As described above, the first controller 160 may control the image processing part 120 to convert a printing image into an image of an RGB or a CMYK color space according to a color space of a stored printing image.

Besides allowing a user to select one of the plural diagnosis images displayed on the first display part 130 and providing the diagnosis information corresponding to the selected diagnosis image as shown in FIGS. 13 and 14, the host apparatus 100 may automatically perform the PSDS through the image forming apparatus (e.g., multi-function peripheral (MFP)) 200 having a scanning part (LSU, see 270 of FIG. 17), a scanning apparatus such as a scanner, etc., which are connectable through the first communication part 150.

FIGS. 15A through 16C illustrate an example embodiment of automatically performing the PSDS. Specifically, when a defect occurs in a printed matter, a user may select the PSDS to fix the defect. If a user selects the PSDS through the first user selection part 110, the first controller 160 generates a user interface (UI) with a message for selecting whether to execute the PSDS and displays the generated message on the first display part 130.

When a user selects to execute the PSDS through the displayed UI, the first controller 160 generates the UI with a message for controlling a scanning apparatus (e.g., the image forming apparatus 200 provided with the scanning part) connected to the host apparatus 100 to scan an actually printed matter having a defect, and displays the generated message on the first display part 130.

Accordingly, the scanning apparatus generates a scan image by scanning the printed matter having the defect, and transmits the generated scan image to the host apparatus 100. The host apparatus 100 receives the scan image from the scanning apparatus, and stores the received scan image in the first storage part 140. Here, if the scan image corresponds to an RGB color space, the first storage part 160 may convert the scan image to correspond to a CMYK color space. The first controller 160 determines a similarity by comparing the scan image with the previously stored diagnosis image and shows a user the determination results.

As shown in FIGS. 15A through 15C and 16A through 16C, the first controller 160 may calculate differences between a scan image (see FIGS. 15B and 16B) and a diagnosis image (see FIGS. 15A and 16A) and determine the similarity. If the similarity between the scan image (see FIG. 15B) and the diagnosis image (see FIG. 15A) is high (i.e., if the scan image (see FIG. 15B) is similar to the diagnosis image (see FIG. 15A)), a substantially black image is output (see FIG. 15C) as a result of calculating the differences.

On the other hand, if the similarity between the scan image (see FIG. 16B) and the diagnosis image (see FIG. 16A) is low (i.e., if the scan image (see FIG. 16B) is different from the diagnosis image (see FIG. 16A)), an image far from black is output (see FIG. 16C) as a result of calculating the differences.

Figure 15A:
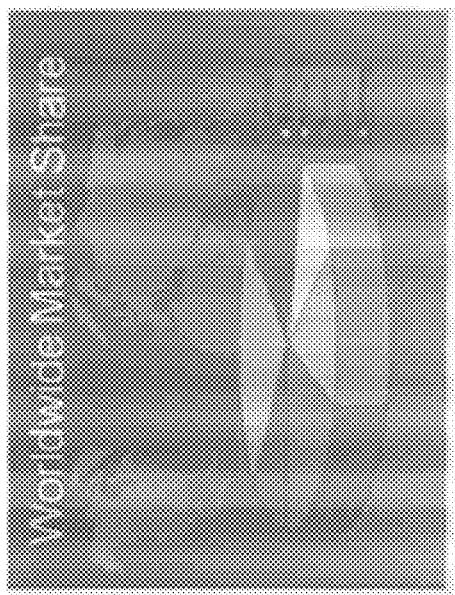
FIGS. 15A through 16C illustrate an example embodiment of automatically performing a Printer Self Diagnosis System (PSDS)
Figure 15B:
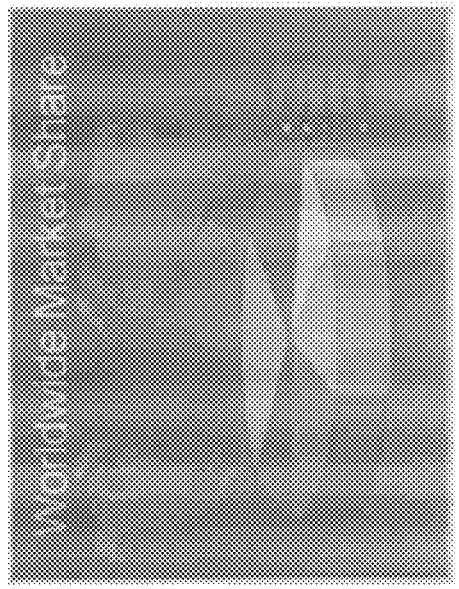
Figure 15C:
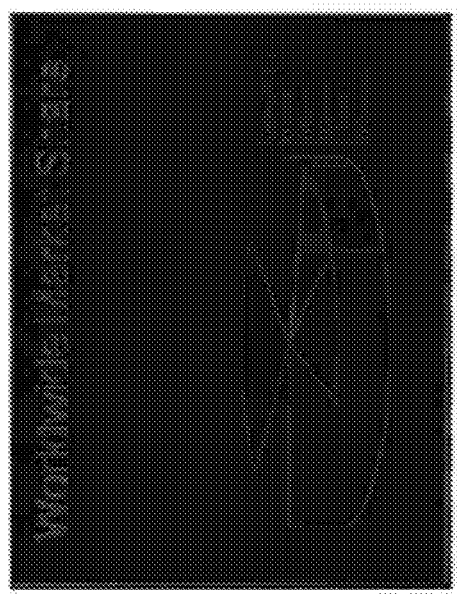

Through the output image displayed on the first display part 130, a user grasps the cause of the problem on the basis of the defect corresponding to the diagnosis image (see FIG. 15A) used in calculating the output image close to black (see FIG. 15C). Specifically, through the first display part 130, the first controller 160 provides a user with the diagnosis information about the defect corresponding to the relevant diagnosis image (see FIG. 15A).

Alternatively, the first controller 160 may compare the generated scan image with the plurality of diagnosis images corresponding to various defects, and show a user a predetermined number of output images having high similarity. For example, a predetermined number (e.g., four) of output images may be sequentially arranged in order of similarity (from highest to lowest or lowest to highest), output images each having 80% or more black areas may be arranged, etc.

Thus, if the problem is not solved by the diagnosis information about the defect corresponding to the output image having the highest similarity, a user may solve the problem on the basis of the diagnosis information about the defect corresponding to another output image having a high similarity. Also, it is possible to sequentially solve problems caused by complex causes due to a plurality of defects.

Figure 11C:
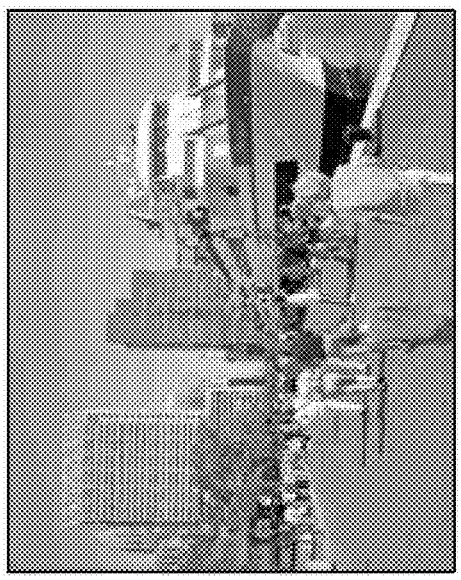

Meanwhile, the first controller 160 may determine the similarity by comparing the diagnosis image and the scan image with regard to a period of a frequency component. For example, the diagnosis image with the defect corresponding to the banding (as shown in FIG. 11C) has a certain frequency component generated in a perpendicular direction to a long side of the print medium. Thus, it is possible to determine the similarity by comparing the frequency component of the scan image with the frequency component of the diagnosis image with respect to the scan image.

Furthermore, the host apparatus 100 may grasp the problem by comparing the scan image with the previously stored diagnosis image and provide a user with the diagnosis information corresponding to the grasped problem through a text or the like without displaying images in order for the user to determine the similarity.

Figure 17:
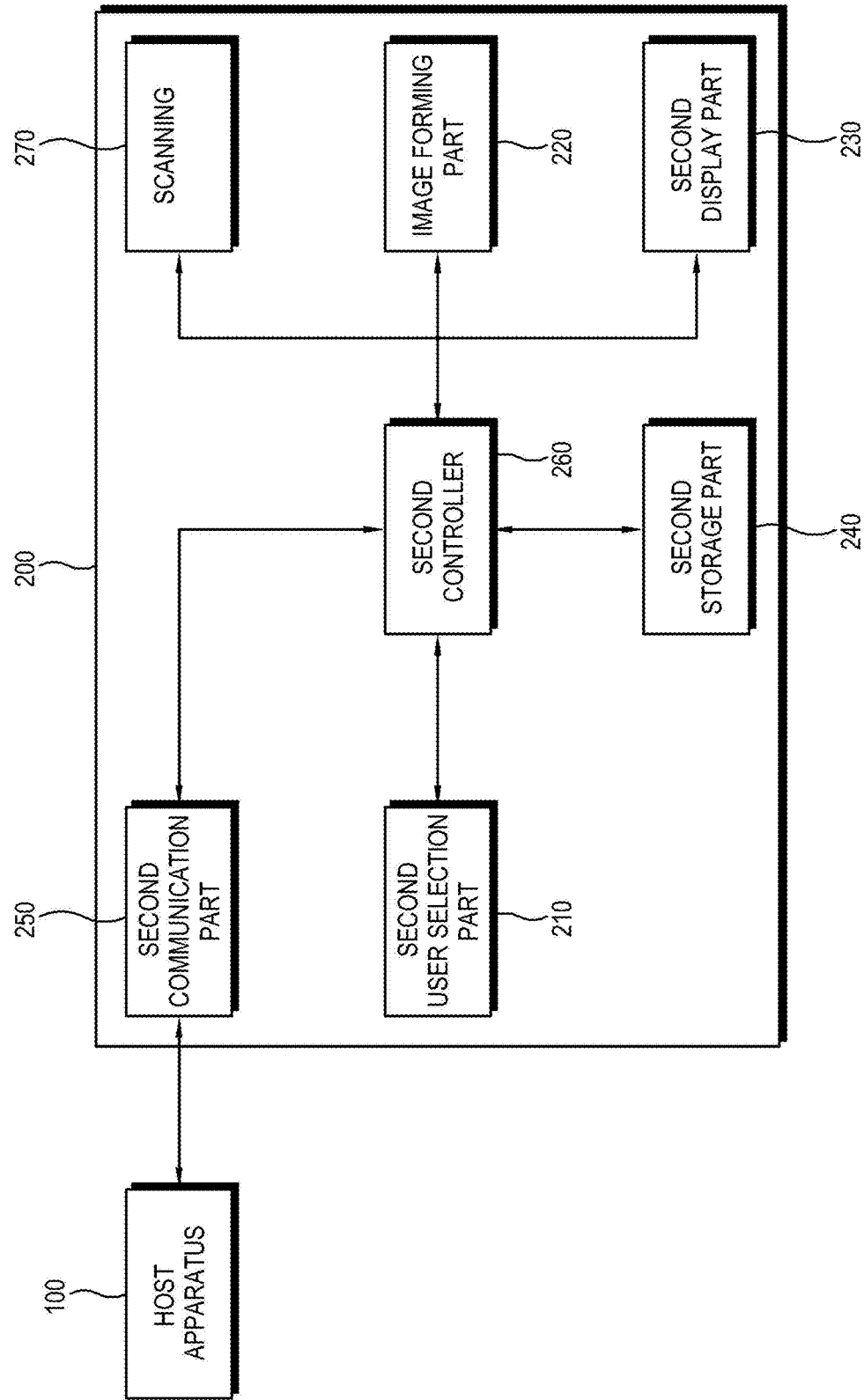
FIG. 17 is a block diagram illustrating an image forming apparatus according to another example embodiment of the present invention.

FIG. 17 is a block diagram illustrating an image forming apparatus 200 according to another example embodiment of the present invention. The image forming apparatus 200 (such as a printer, a multi-function peripheral (MFP), etc.) prints data received from the host apparatus 100 or data stored in a memory (such as a USB memory) in response to a direct printing command or the like, or prints the scan image on a print medium (such as paper, a transparency, etc.) in response to a scanning or copying command.

The image forming apparatus 200 is connected to at least one host apparatus 100, and may include a Printer Self Diagnosis System (PSDS) about various problems that may occur in the image forming apparatus 200. The PSDS may be achieved by executing a predetermined application program installed in the image forming apparatus 200. That is, the application program for the PSDS for the image forming apparatus 200 may be installed in the image forming apparatus 200.

The image forming apparatus 200 operates the PSDS in the same manner as the host apparatus 100 described above, and may perform the same operations in the PSDS through the same elements as those of the host apparatus 100 described above.

Referring to FIG. 17, the image forming apparatus 200 includes a second user selection part 210, an image forming part 220, a second display part 230, a second storage part 240, a second communication part 250, a second controller 260 and a scanning part 270.

The second user selection part 210 enables a user to input a printing command and select whether to execute the PSDS for the image forming apparatus 200. Specifically, a user may select whether to input a printing command and execute the PSDS through the second user selection part 210. Here, the printing includes printing for a copy after scanning a document, printing for received fax data, and/or printing for print data received from an outside source through the host apparatus including a server or print data stored in the second storage part 240 (such as a hard disk drive, a USB memory, etc.).

The second user selection part 210 may include a key button (hereinafter, also referred to as a "hard key" or "keypad") provided on a body of the image forming apparatus 200 and/or may include a user interface (UI) (hereinafter, also referred to as a "graphic user interface (GUI)") generated by executing a predetermined application and displayable through the second display part 230.

The image forming part 220 forms an image to be printed on at least one print medium (such as paper, a transparency, etc.) on the basis of print data when receiving a printing command. In this embodiment, an image forming process may include an image fixing process.

If the image forming apparatus 200 receives print data from the host apparatus 100 or receives a copying command, a direct printing command, etc., through the second user selection part 210, the image forming apparatus 200 controls the image forming part 220 to perform the printing and the second storage part 240 to store a printing image corresponding to the print data.

Furthermore, if the execution of the PSDS is selected through the second user selection part 210, the image forming apparatus 200 calls a corresponding application program, and provides a UI to inspect whether a printed matter from the image forming apparatus 200 has a defect for the user. If the printed matter has a defect, the user may select execution of the PSDS for the image forming apparatus 200 through the displayed UI. Here, the image forming apparatus 200 may make an inquiry about whether to execute the PSDS after completing the printing and then correspondingly perform the PSDS, may execute the PSDS according to user's selection irrespective of the printing, or may execute the PSDS without a user selection. If the user selects execution of the PSDS for the image forming apparatus 200, the image forming apparatus 200 may enable a user to select the diagnosis image or the printing image stored in the second storage part 240 through the second user selection part 210.

Figure 18:
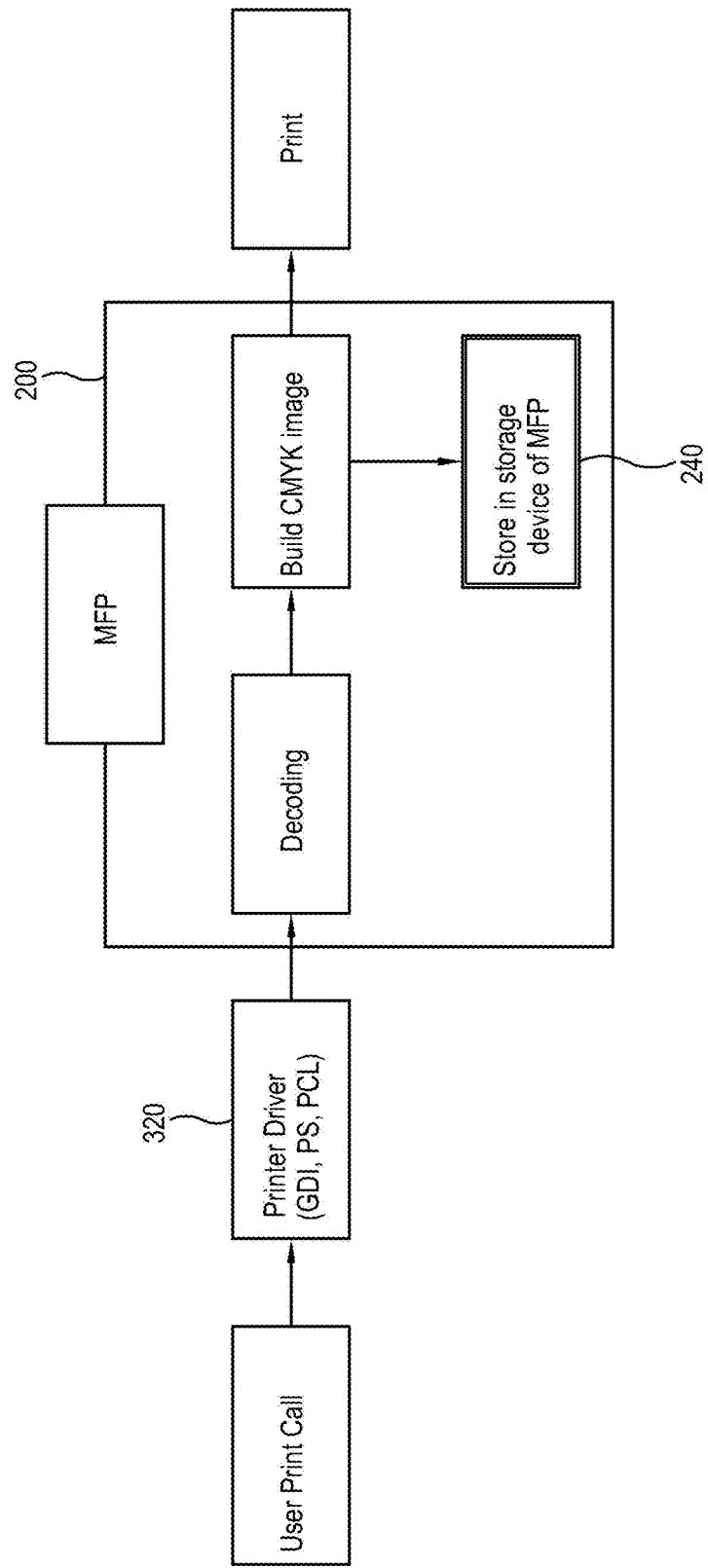
FIGS. 18 and 19 are diagrams illustrating printing images stored according to another example embodiment of the present invention.
Figure 19:
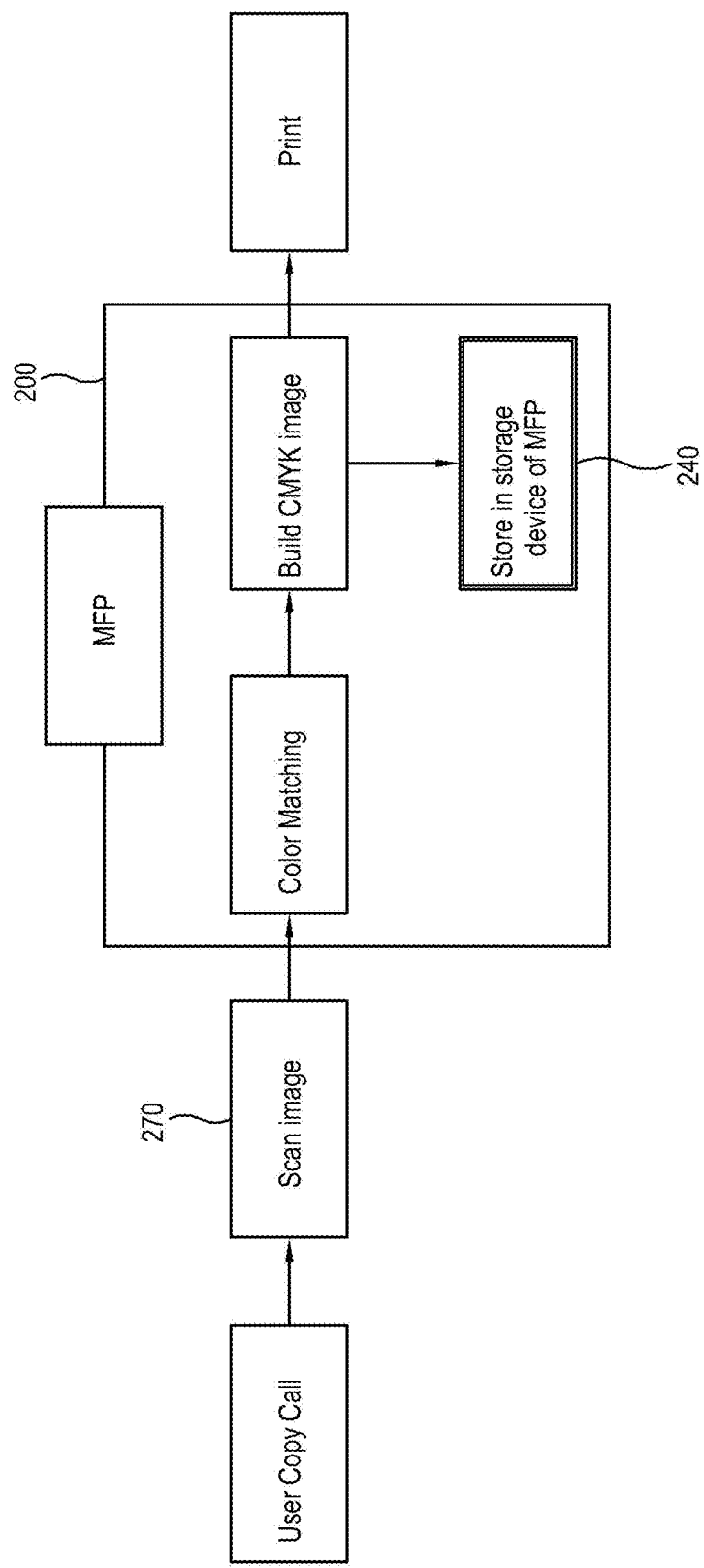

FIGS. 18 and 19 are diagrams illustrating printing images stored according to another example embodiment of the present invention. Referring to FIG. 18, the image forming apparatus 200 may receive a printing image of a predetermined printer language (e.g., Graphics Device Interface (GDI), Printer Command Language (PCL), PostSript (PS), etc.) from the host apparatus 100 according to a user's printing command. Here, the printing image is a CMYK halftone image using a printer language corresponding to the printer driver 320 of the corresponding host apparatus 100 and received in an encoded state.

The second controller 260 decodes the received printing image and controls the image forming part 220 to perform the printing. As shown in FIG. 18, the second controller 260 converts the decoded halftone image into a contone image and stores the contone image in the second storage part 240. Here, the conversion from the halftone image to the contone image may be the same as the conversion of the halftone image described with reference to FIGS. 9A through 9D.

Referring to FIG. 19, the image forming apparatus 200 may generate a printing image scanned according to a user's copying command. Here, the generated printing image may be an RGB image. Thus, the second controller 260 performs color matching with respect to the generated printing image (i.e., generates a CYMK printing image through the RGB2CMYK color table), and stores the printing image in the second storage part 240.

Meanwhile, the second controller 260 may reduce the printing image in consideration of the size and the resolution of the second display part 230, and store the reduced printing image in the second storage part 240. For example, if the image forming apparatus 200 uses four channels of CMYK and has performance of 600 dots per inch (DPI), the output image has a width of 4961 pixel(px) and a height of 7016 px with respect to A4 size and occupies a significantly large storage space of about 139 MB if considering four channels of CMYK. The output image is not only excessively large as compared with the size and resolution of the second display part 230 (e.g., an LCD window), but also needs large storage capacity. If the size of the stored printing image is excessively large, a processing speed may be lowered while generating a diagnosis image, performing the PSDS, etc. in the future. Thus, the second controller 260 reduces the printing image of the contone image to have a predetermined size depending on the size and the resolution of the second display unit 230, and stores the reduced printing image in the second storage part 240.

Further, the second controller 260 may generate a thumbnail image from the printing image, and control the second storage unit 240 to store the generated thumbnail image together with the printing image and/or the diagnosis image.

If the execution of the PSDS is selected through the second user selection part 210, the second controller 260 converts the printing image stored in the second storage part 240 to correspond to an RGB color space that is displayable through the second display part 230, and displays the converted printing image on the second display part 230, as shown in FIG. 12. Here, the image forming apparatus 200 may employ the RGB2CMYK color table described above with reference to the host apparatus 100, or a CMYK2RGB conversion method.

Also, when the printing image stored in the second storage part 240 is not reduced and stored, the second controller 260 may reduce the size of the printing image to be displayed on the second display part 230. Moreover, the thumbnail image corresponding to the printing image may be separately stored, and may be displayed on the second display part 230. Through the second user selection part 210, a user may select one of the printing images (or thumbnail images) for the PSDS among the plurality of printing images shown in FIG. 12.

The second display part 230 may, although not necessarily, include a TFT-LCD and a driving part (not shown) to drive the TFT-LCD. The second storage part 240 may include an internal storage medium such as an HDD, or an external or portable storage medium such as a universal serial bus (USB) memory and a memory card (memory stick, compact flash (CF) card, multi-media card (MMC)). Accordingly, the second storage part 240 stores the printing image, the defect image, and/or the scan image.

The stored printing images may be regularly or irregularly deleted to maintain a preset number. Specifically, if a new printing image is generated according to a printing command, the second controller 260 may regularly or irregularly delete previous printing images corresponding to previously performed printing operations to maintain the preset number of printing images stored in the second storage part 240.

If one of the printing images in FIG. 12 is selected through the second user selection part 210, the second controller 260 generates the diagnosis image on the basis of the selected printing image and the defect image previously stored in the second storage part 240. To this end, the second storage part 240 previously stores the defect images corresponding to the plurality of defects that may occur in the image forming apparatus 200. Here, the stored defect image may be stored according to preset defect categories.

Furthermore, the second storage part 140 may also store a diagnosis record including diagnosis information corresponding to a diagnosis image generated based on a printing image and a defect image and a selected diagnosis image. The diagnosis image may correspond to a CMYK color space. The stored diagnosis record may be periodically used when a similar defect occurs later in the image forming apparatus 200 or when desired by a manager or a user.

In the image forming apparatus 200, a process of generating the diagnosis image may include a diagnosis image generating method as shown in FIGS. 10 and 11.

The second controller 260 controls the second display part 230 to display the diagnosis images generated based on the printing image selected as shown in FIG. 13 and the defect image stored in the second storage part 240 according to one selected among the printing images of FIG. 12.

If one among the displayed diagnosis images is selected through the second user selection part 210, the second controller 260 may control the second display part 230 to display diagnosis information on the selected diagnosis image or to display a more detailed diagnosis image for the selected diagnosis image, as shown in FIG. 14. Alternatively (or additionally), the second controller 260 may control the second display part 230 to display both the diagnosis image and the diagnosis information on the diagnosis image, as shown in FIG. 14.

The diagnosis information of the image forming apparatus 200 may include the diagnosis information displayed in the host apparatus 100 as described above with reference to FIG. 1.

The second communication unit 250 receives the printing image from the host apparatus 100 or the like. The second communication unit 250 may be a wired and/or wireless communication module, such a USB port, an infrared port, a Bluetooth port, etc. that communicates with an external apparatus such as the host apparatus 100.

The second controller 260 controls the overall operations of the host apparatus 100. That is, the second controller 260 controls the image forming part 220 to perform the printing according to a printing command, stores the generated or received printing image in the second storage part 240, and generates the diagnosis image based on the stored printing image and defect images when execution of the PSDS is selected.

As shown in FIG. 12, the second controller 260 may display stored printing images on the second display part 230 as a user selectable UI. If a user selects a printing image on the displayed UI via the second user selection part 210, the second controller 260 generates a diagnosis image based on the selected printing image and a defect image stored in the second storage part 240. Furthermore, the second controller 260 may display the generated diagnosis image and/or diagnosis information on the second display part 230, as shown in FIGS. 13 and 14. Here, the second controller 260 decodes a printing image into a contone image to be stored, and converts the printing image of the CMYK color space into an RGB image to be displayed on the second display part 230.

The image forming apparatus 200 may perform the PSDS through the separate scanning part 270 as opposed to (or in addition to) allowing a user to select one of the plural diagnosis images displayed on the second display part 230. Specifically, the scanning part 270 generates a scan image from a scan-objective copy. The scan-objective copy includes a document, a photograph, a film, etc. Here, the scanning part 270 may read a scan-objective copy per unit of a predetermined block to generate a scan image, in which the generated scan image may be an RGB image. The second controller 260 may use the RGB2CMYK color table to convert an RGB scan image into a CMYK scan image.

If an actually printed matter has a defect, a user may select the PSDS through the second user selection part 210 in order to solve a problem of the defect. If a user selects the PSDS, the second controller 260 generates a UI with a message for selecting whether to execute the PSDS and displays the generated UI on the second display part 230.

When a user selects to execute the PSDS through the displayed UI, the second controller 260 generates the UI with a message for scanning the actually printed matter having a defect, and displays the generated UI on the second display part 230. Accordingly, the scanning part 270 generates a scan image by scanning the printed matter having the defect, and converts the generated scan image into a CMYK image to be stored in the second storage part 240. The second controller 260 determines a similarity by comparing the scan image with the previously stored diagnosis image(s) and shows a user the determination results.

Figure 16A:
Figure 16B:
Figure 16C:

As shown in FIGS. 15 and 16, the second controller 260 may calculate differences between a scan image (see FIGS. 15B and 16B) and a diagnosis image (see FIGS. 15A and 16A) to determine the similarity, or may compare the diagnosis image and the scan image with regard to a period of a frequency component to determine the similarity.

Through the second display part 230, the second controller 260 provides a user with the diagnosis information about the defect corresponding to the diagnosis image having a high similarity. Alternatively, the second controller 260 may compare the generated scan image with the plurality of diagnosis images corresponding to various defects, and show a user a predetermined number of output images having a high similarity.

In some aspects, the host apparatus 100 may grasp problem by comparing the scan image with the previously stored diagnosis image and provide a user with the diagnosis information corresponding to the grasped problem through a text or the like without displaying images in order for the user to determine the similarity.

If the image forming apparatus 200 performing the PSDS is not provided with the scanning part 270, the PSDS may be performed by receiving a scan image generated through a connectable separate scanning apparatus, and comparing the received scan image with the diagnosis image.

Thus, according to aspects of the present invention, the host apparatus 100 or the image forming apparatus 200 generates a diagnosis image based on a printing image actually printed by a user and displays diagnosis information according to the PSDS or a user's selection, thereby enhancing efficiency of a diagnosis and convenience to a user.

According to some aspects of the present invention, a printing image, a defect image, and/or a diagnosis image may be stored in a separate server or the like (as opposed to the host apparatus 100 or the image forming apparatus 200), and the host apparatus 100 or the image forming apparatus 200 may receive the printing image, the defect image, and the diagnosis image to execute the PSDS.

Figure 20A:
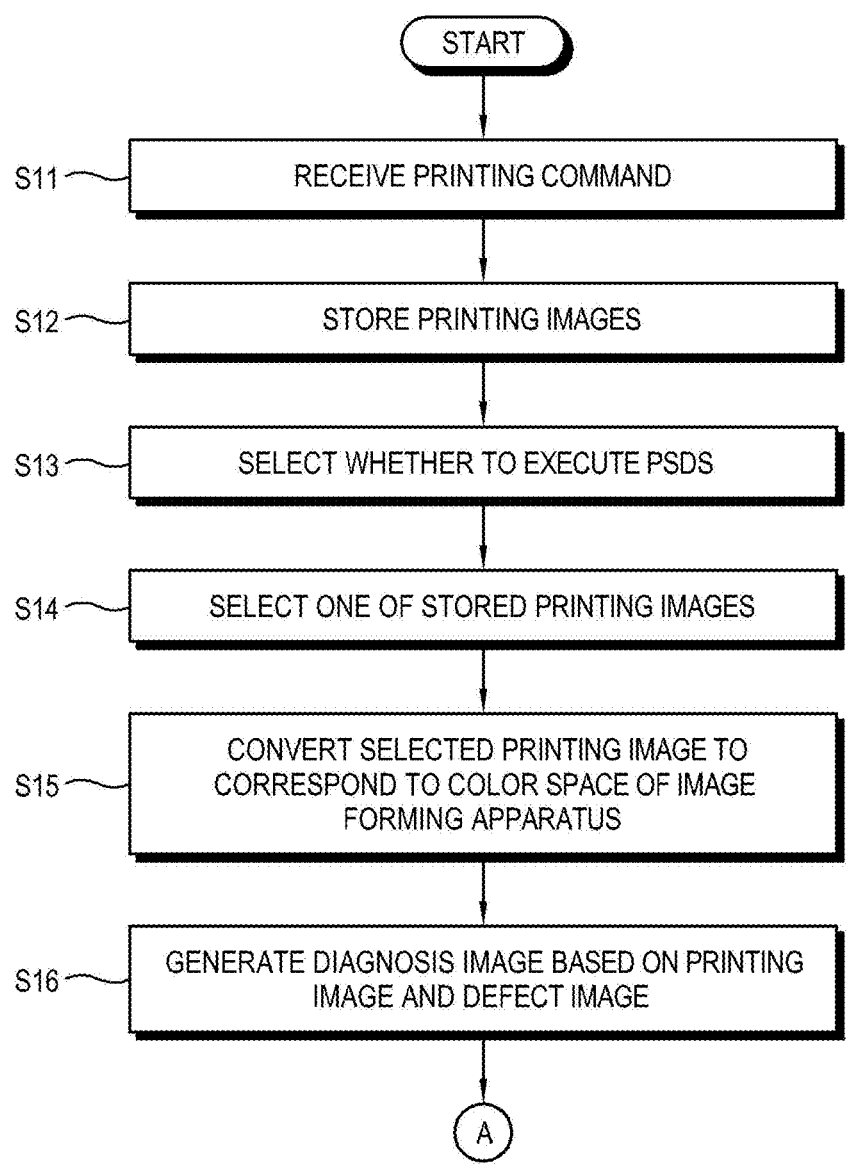
FIGS. 20A and 20B are flowcharts illustrating a diagnosis method for an image forming apparatus according to an example embodiment of the present invention.
Figure 20B:
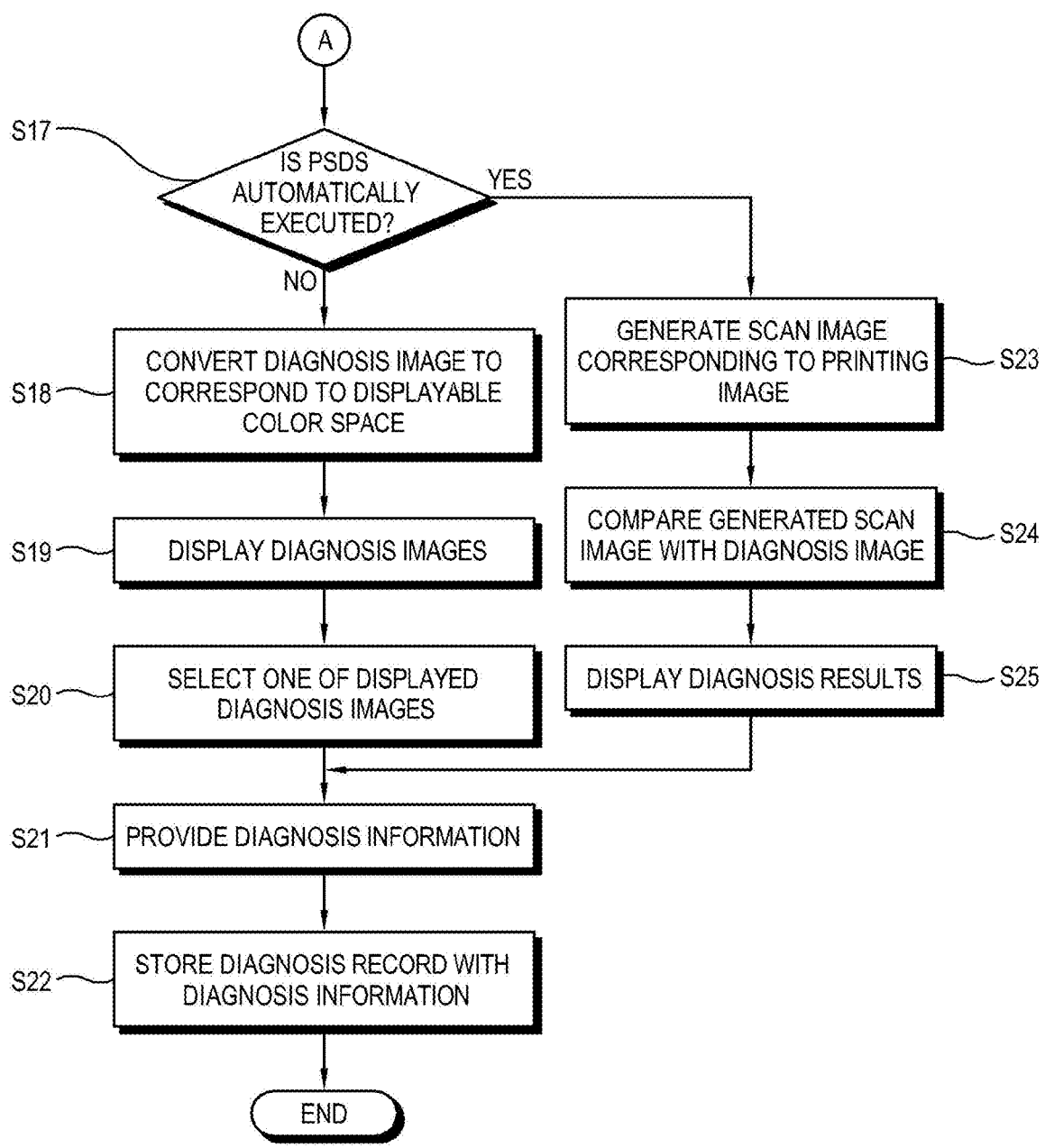

Hereinafter, a diagnosis process of the host apparatus 100 or the image forming apparatus 200 with the above-configuration will be described with reference to FIGS. 20A and 20B. Referring to FIGS. 20A and 20B, the host apparatus 100 or the image forming apparatus 200 receives a printing command from a user in operation S11.

Then, the controller 160, 260 stores a printing image corresponding to the printing command in the storage part 140, 240 in operation S12. The stored printing image may be a rendering image, a halftone image, or a capture image. The number of stored printing images may be predetermined and, to this end, may be regularly or irregularly deleted by the controller 160, 260. In the operation S12, the second controller 260 may convert the halftone image into the contone image, reduce the converted contone image according to the size and the resolution of the second display part 230, and store the reduced contone image in the second storage part 240.

According to the printing command in operation S11, the controller 160, 260 displays a message for selecting diagnosis execution for the image forming apparatus 200 through the display part 130, 230 in operation S13. If diagnosis execution for the image forming apparatus 200 is selected in operation S13, the controller 160, 260 displays stored printing images on the display part 130, 230 so that one of the displayed printing images can be selected in operation S14. Here, a user may use the user selection part 110, 210 to select and perform the operation S14 irrespective of whether a printing command is received in operation S11 (i.e., operations S11 and S12 may be omitted).

The controller 160, 260 converts the selected printing image to correspond to a color space (for example, CMYK color space) of the image forming apparatus 200 in operation S15. In the operation S12, if the printing image is stored as a CMYK image, the operation S15 may be omitted.

The controller 160, 260 controls the image processing part 120 to generate diagnosis images based on the selected printing image and stored defect images in operation S16. In this respect, the diagnosis images may be generated for a plurality of color channels, respectively.

Then, a user may select whether to execute the PSDS through the user selection part 110, 210 in operation S17. If the PSDS is not selected to be executed (operation S17), the generated diagnosis image (operation S16) is converted to correspond to a color space (e.g., RGB color space) that can be displayed through the display part 130, 230 in operation S18. However, it is understood that according to other aspects, the diagnosis images are generated to be in the proper color space, such that operation S18 may be omitted. The generated diagnosis images are displayed on the display part 130, 230 in operation S19. Then, one of the displayed diagnosis images of the operation S19 is selected through the user selection part 110, 210 in operation S20. Accordingly, the controller 160, 260 provides diagnosis information corresponding to the selected diagnosis image for a user through the display part 130, 230 in operation S21. Moreover, the controller 160, 260 stores a diagnosis record for the image forming apparatus 200 in the storage part 140, 240 in operation S22.

Meanwhile, when the execution of the PSDS is selected (operation S17), the controller 160, 260 generates a scan image corresponding to the selected printing image (operation S14) in operation S23. Here, the host apparatus 100 may receive the scan image generated by a separate scanning apparatus via the first communication part 150, or the image forming apparatus 200 may generate a scan image through the scanning part 270. The controller 160, 260 compares the generated scan image (operation S23) with the generated diagnosis image (operation S16) in operation S24. Here, the controller 160, 260 may calculate differences between the generated scan image and the generated diagnosis image, or may compare the generated scan image and the generated diagnosis image with respect to the period of the frequency. The controller 160, 260 displays diagnosis results from the comparison (operation S24) in operation S25. Here, the controller 160, 260 may control the display part 130, 230 to display a predetermined number of diagnosis images determined as having high similarity in the operation S24. The controller 160, 260 provides a user the diagnosis information corresponding to the diagnosis image (operation S25) in operation S21. Further, the controller 160, 260 may store the diagnosis record for the image forming apparatus 200 in the storage part 140, 240 in operation S22.

As described above, aspects of the present invention provide a host apparatus, an image forming apparatus, and a diagnosis method for the image forming apparatus that generates an image for diagnosing a defect based on an image that is actually printed by a user, thereby enhancing efficiency of a diagnosis and convenience to a user. Also, aspects of the present invention provide a host apparatus, an image forming apparatus, and a diagnosis method for the image forming apparatus that uses a similarity measured by comparing an actually printed image with a generated image for a diagnosis, thereby improving accuracy of the diagnosis. Furthermore, aspects of the present invention provide a host apparatus, an image forming apparatus, and a diagnosis method for the image forming apparatus that diagnoses a defect by an application program on a personal computer, as well as online, thereby avoiding wasting time and costs due to a repair service.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A diagnosis method to determine defects of an image forming apparatus, the diagnosis method comprising:
    storing a printing image generated from print data according to a printing command;
    generating a diagnosis image for the stored printing image based on the stored printing image and a defect image corresponding to a predetermined defect of the image forming apparatus; and
    comparing the generated diagnosis image with a scan image of a printed image that is printed by the image forming apparatus on a print medium according to the print data.

2. The method as claimed in claim 1, further comprising displaying the generated diagnosis image.

3. The method as claimed in claim 1, wherein the generating of the diagnosis image comprises:
    generating a first diagnosis image for the printing image based on the stored printing image and a first defect image corresponding to a first predetermined defect of the image forming apparatus; and
    generating a second diagnosis image for the printing image based on the stored printing image and a second defect image corresponding to a second predetermined defect of the image forming apparatus.

4. The method as claimed in claim 3, further comprising selecting one of the diagnosis images.

5. The method as claimed in claim 4, further comprising providing diagnosis information corresponding to the selected diagnosis image.

6. The method as claimed in claim 1, further comprising:
    providing diagnosis information corresponding to the diagnosis image; and
    storing a diagnosis record comprising the diagnosis information.

7. The method as claimed in claim 1, further comprising:
    selecting one of a plurality of stored printing images,
    wherein the generating of the diagnosis image comprises generating the diagnosis image for the selected printing image.

8. The method as claimed in claim 7, wherein the generating of the diagnosis image for the selecting printing image comprises:
    converting the selected printing image to correspond to a color space of the image forming apparatus; and
    generating the diagnosis image by synthesizing the converted printing image and the defect image.

9. The method as claimed in claim 1, wherein the stored printing image is regularly or irregularly deleted to maintain a predetermined number of stored printing images.

10. The method as claimed in claim 1, wherein the generating of the diagnosis image comprises:
    generating a first diagnosis image for the printing image for a first color channel; and
    generating a second diagnosis image for the printing image for a second color channel.

11. The method as claimed in claim 1, further comprising generating the scan image; and displaying a diagnosis result according to the comparing of the scan image with the generated diagnosis image.

12. The method as claimed in claim 11, wherein the displaying the diagnosis result comprises displaying at least one diagnosis image having a similarity with the scan image that is higher than a predetermined similarity according to the comparing of the scan image with the generated diagnosis image.

13. The method as claimed in claim 1, wherein the storing of the printing image comprises reducing the printing image to correspond to a display part of the image forming apparatus.

14. The method as claimed in claim 1, further comprising displaying a message for selecting diagnosis execution for the printing image.

15. The method as claimed in claim 1, wherein the printing image is a rendering image, a halftone image, or a capture image.

16. An image forming apparatus comprising:
   an image forming part to print an image on a print medium based on a printing image generated from print data according to a printing command;
   a storage part to store a defect image corresponding to a predetermined defect of the image forming apparatus; and
   a controller to store the printing image in the storage part, to generate a diagnosis image for the printing image based on the stored printing image and the stored defect image, and to compare the generated diagnosis image with a scan image of the printed image.

17. The image forming apparatus as claimed in claim 16, further comprising a display part to display the generated diagnosis image.

18. The image forming apparatus as claimed in claim 17, wherein the controller reduces the printing image to correspond to the display part and stores the reduced printing image in the storage part.

19. The image forming apparatus as claimed in claim 17, further comprising:
   a scanning part to generate the scan image by scanning the printed image,
   wherein the controller controls the display part to display a diagnosis result according to the comparing of the scan image with the generated diagnosis image.

20. The image forming apparatus as claimed in claim 19, wherein the display part displays at least one diagnosis image having a similarity with the scan image that is higher than a predetermined similarity according to the comparing of the scan image with the generated diagnosis image.

21. The image forming apparatus as claimed in claim 17, wherein the display part displays a message for selecting diagnosis execution for the printing image.

22. The image forming apparatus as claimed in claim 16, wherein:
   the storage part stores a first defect image corresponding to a first predetermined defect and a second defect image corresponding to a second predetermined defect; and
   the controller generates a first diagnosis image based on the stored printing image and the first defect image and a second diagnosis image based on the stored printing image and the second defect image.

23. The image forming apparatus as claimed in claim 16, further comprising:
   a display part to display the generated diagnosis images; and
   a user selection part to select one of the displayed diagnosis images.

24. The image forming apparatus as claimed in claim 23, wherein the display part displays diagnosis information corresponding to the selected diagnosis image.

25. The image forming apparatus as claimed in claim 24, wherein the controller stores a diagnosis record comprising the diagnosis information in the storage part.

26. The image forming apparatus as claimed in claim 16, further comprising:
   a user selection part to receive a user selection,
   wherein one of a plurality of stored printing images, stored in the storage part, is selected through the user selection part, and the controller generates a diagnosis image for the selected printing image.

27. The image forming apparatus as claimed in claim 16, wherein the controller regularly or irregularly deletes the stored printing image to maintain a predetermined number of stored printing images in the storage part.

28. The image forming apparatus as claimed in claim 16, wherein the controller generates a first diagnosis image for the printing image for a first color channel and a second diagnosis image for the printing image for a second color channel.

29. The image forming apparatus as claimed in claim 16, wherein the controller converts the printing image to correspond to a color space of the image forming apparatus, and generates the diagnosis image by synthesizing the converted printing image and the defect image.

30. The image forming apparatus as claimed in claim 16, wherein the controller decodes the printing image into a halftone image, and converts the halftone image into a contone image.

31. The host apparatus as claimed in claim 30, wherein:
   the storage part stores a first defect image corresponding to a first predetermined defect and a second defect image corresponding to a second predetermined defect; and
   the controller controls the image processing part to generate a first diagnosis image based on the stored printing image and the first defect image and a second diagnosis image based on the stored printing image and the second defect image.

32. The host apparatus as claimed in claim 31, further comprising:
   a display part to display the generated diagnosis images; and
   a user selection part to select one of the displayed diagnosis images.

33. The host apparatus as claimed in claim 32, wherein the display part displays diagnosis information corresponding to the selected diagnosis image.

34. The host apparatus as claimed in claim 33, wherein the controller stores a diagnosis record comprising the diagnosis information in the storage part.

35. The host apparatus as claimed in claim 34, further comprising:
   a user selection part to receive a user selection,
   wherein one of a plurality of stored printing images, stored in the storage part, is selected through the user selection part, and the controller generates a diagnosis image for the selected printing image.

36. A host apparatus to diagnose a defect in an image forming apparatus connected thereto, the host apparatus comprising:
   an image processing part to generate a printing image from print data according to a printing command;
   a storage part to store a defect image corresponding to a predetermined defect of the image forming apparatus; and a controller to store the printing image in the storage part, to control the image processing part to generate a diagnosis image for the printing image based on the stored printing image and the defect image, and to compare the generated diagnosis image with a scan image of a printed image that is printed by the image forming apparatus on a print medium according to the print data.

37. The host apparatus as claimed in claim 36, further comprising a display part to display the generated diagnosis image.

38. The host apparatus as claimed in claim 37, further comprising:
    a communication part to communicate with the image forming apparatus,
    where the controller receives, through the communication part, the scan image and provides a diagnosis result according to the comparing of the received scan image with the generated diagnosis image.

39. The host apparatus as claimed in claim 38, wherein the display part displays at least one diagnosis image having a similarity with the scan image that is higher than a predetermined similarity according to the comparing of the received scan image with the generated diagnosis image.

40. The host apparatus as claimed in claim 37, wherein the display part displays a message for selecting diagnosis execution for the printing image.

41. The host apparatus as claimed in claim 36, wherein the controller regularly or irregularly deletes the stored printing image to maintain a predetermined number of stored printing images in the storage part.

42. The host apparatus as claimed in claim 36, wherein the controller generates a first diagnosis image for the printing image for a first color channel and a second diagnosis image for the printing image for a second color channel.

43. The host apparatus as claimed in claim 36, wherein the controller converts the printing image to correspond to a color space of the image forming apparatus, and generates the diagnosis image by synthesizing the converted printing image and the defect image.

44. The host apparatus as claimed in claim 36, wherein the printing image comprises a rendering image, a halftone image, or a capture image.

45. A diagnosis method to determine defects of an image forming apparatus, the diagnosis method comprising:
    storing, by the image forming apparatus, a printing image generated from print data according to a printing command;
    generating, by the image forming apparatus, a diagnosis image for the stored printing image based on the stored printing image and a defect image corresponding to a predetermined defect of the image forming apparatus;
    printing, by the image forming apparatus, an image onto a print medium according to the print data;
    scanning, by the image forming apparatus, the printed image to generate a scan image; and
    comparing, by the image forming apparatus, the generated diagnosis image with the scan image.

46. The method as claimed in claim 45, further comprising:
    providing a diagnosis result according to the comparing of the scan image with the generated diagnosis image.

47. The method as claimed in claim 45, further comprising:
    receiving the printing image from a host apparatus.

48. A diagnosis method to determine defects of an image forming apparatus, the diagnosis method comprising:
    storing, by a host apparatus, a printing image generated from print data according to a printing command;
    generating, by the host apparatus, a diagnosis image for the stored printing image based on the stored printing image and a defect image corresponding to a predetermined defect of the image forming apparatus;
    receiving, by the host apparatus, a scan image of a printed image that is printed by the image forming apparatus on a print medium according to the print data; and
    comparing, by the host apparatus, the generated diagnosis image with the received scan image.

49. The method as claimed in claim 48, further comprising:
    providing a diagnosis result according to the comparing of the scan image with the generated diagnosis image.

* * * * *